(12) United States Patent
Ng

(10) Patent No.: US 11,008,105 B2
(45) Date of Patent: May 18, 2021

(54) AIRCRAFT SEAT

(71) Applicant: SINGAPORE AIRLINES LIMITED, Singapore (SG)

(72) Inventor: Yung Han Ng, Singapore (SG)

(73) Assignee: SINGAPORE AIRLINES LIMITED, Airline House (SG)

( * ) Notice: Subject to any disclaimer, the term of this patent is extended or adjusted under 35 U.S.C. 154(b) by 0 days.

(21) Appl. No.: 16/645,922

(22) PCT Filed: Oct. 3, 2017

(86) PCT No.: PCT/SG2017/050498
§ 371 (c)(1),
(2) Date: Mar. 10, 2020

(87) PCT Pub. No.: WO2019/070194
PCT Pub. Date: Apr. 11, 2019

(65) Prior Publication Data
US 2020/0277059 A1    Sep. 3, 2020

(51) Int. Cl.
*B64D 11/06*    (2006.01)
(52) U.S. Cl.
CPC ........ *B64D 11/064* (2014.12); *B64D 11/0606* (2014.12); *B64D 11/0641* (2014.12); *B64D 11/06395* (2014.12)
(58) Field of Classification Search
CPC .............. B64D 11/064; B64D 11/0606; B64D 11/06395; B64D 11/0641; B64D 11/0601; Y02T 50/40
See application file for complete search history.

(56) References Cited

U.S. PATENT DOCUMENTS

| 2001/0000639 A1 | 5/2001 | Park et al. |
| 2003/0075965 A1 | 4/2003 | Pham et al. |
| 2005/0151405 A1 | 7/2005 | Dowty et al. |
| 2011/0175422 A1 | 7/2011 | Bruck |

(Continued)

FOREIGN PATENT DOCUMENTS

EP    2 783 983 A1    10/2014

OTHER PUBLICATIONS

Int. Search Report dated Feb. 1, 2018 issued by the Int. Searching Authority in Application No. PCT/SG2017/050498 (PCT/ISA/210).

*Primary Examiner* — Valentina Xavier
(74) *Attorney, Agent, or Firm* — Sughrue Mion, PLLC

(57) ABSTRACT

A seat is disclosed. The seat comprises a moveable seat carriage having a seat pan and a seat back supported thereon. The seat also comprises a seat base supporting the moveable seat carriage thereupon and a support member moveable between a retracted configuration and an extended configuration, wherein a first end of the support member is coupled to the moveable seat carriage and a second end of the support member is coupled to the seat base. The seat also comprises an actuator to move the moveable seat carriage relative to the seat base to thereby transition the seat between an upright and a reclined position, with the movement of the seat carriage driving the support member between the retracted configuration and the extended configuration, wherein the support member stiffens the seat as the seat transitions away from the upright to the reclined position and while in the reclined position.

28 Claims, 31 Drawing Sheets

(56) References Cited

U.S. PATENT DOCUMENTS

| | | |
|---|---|---|
| 2014/0084647 A1 | 3/2014 | Darbyshire et al. |
| 2015/0136904 A1* | 5/2015 | Savard .................... B60N 2/24 |
| | | 244/118.6 |
| 2016/0144964 A1* | 5/2016 | Braca .................. B64D 11/064 |
| | | 297/63 |
| 2017/0043876 A1 | 2/2017 | Oleson et al. |
| 2017/0106980 A1 | 4/2017 | Kuyper et al. |
| 2020/0047890 A1* | 2/2020 | Simpson ............ B64D 11/0641 |

* cited by examiner

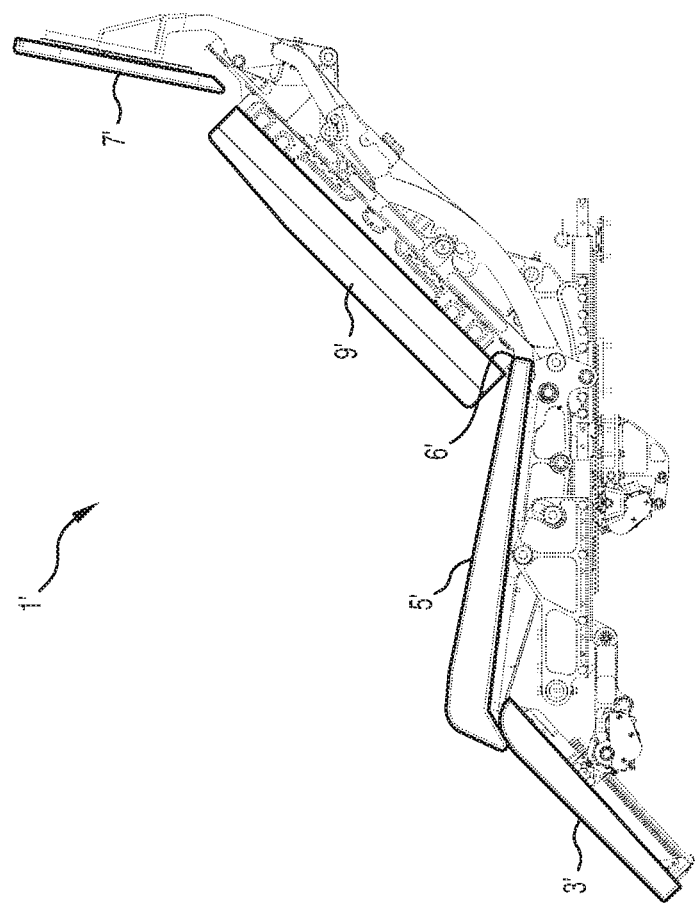
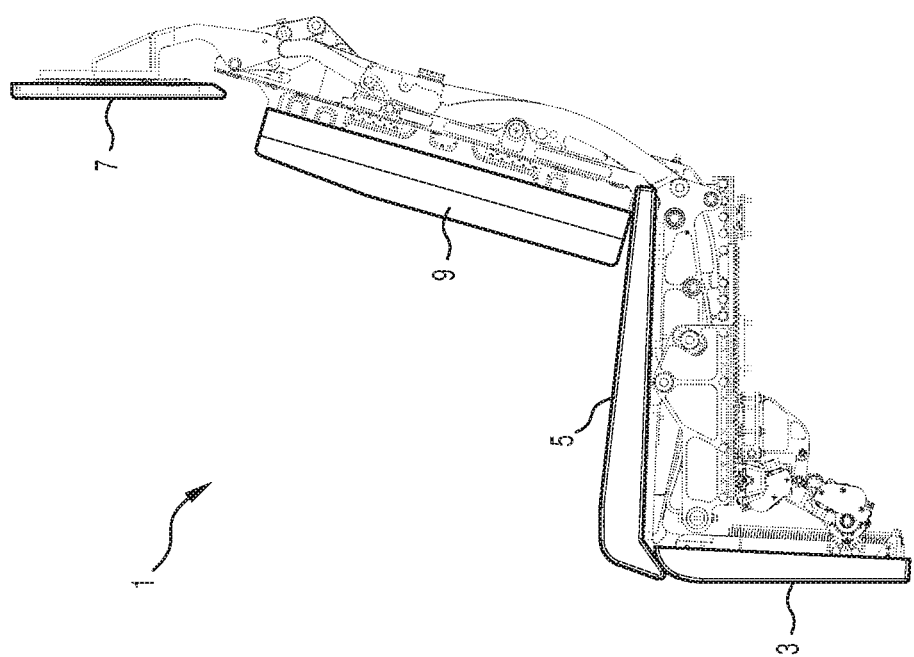
Figure 1B
Figure 1A

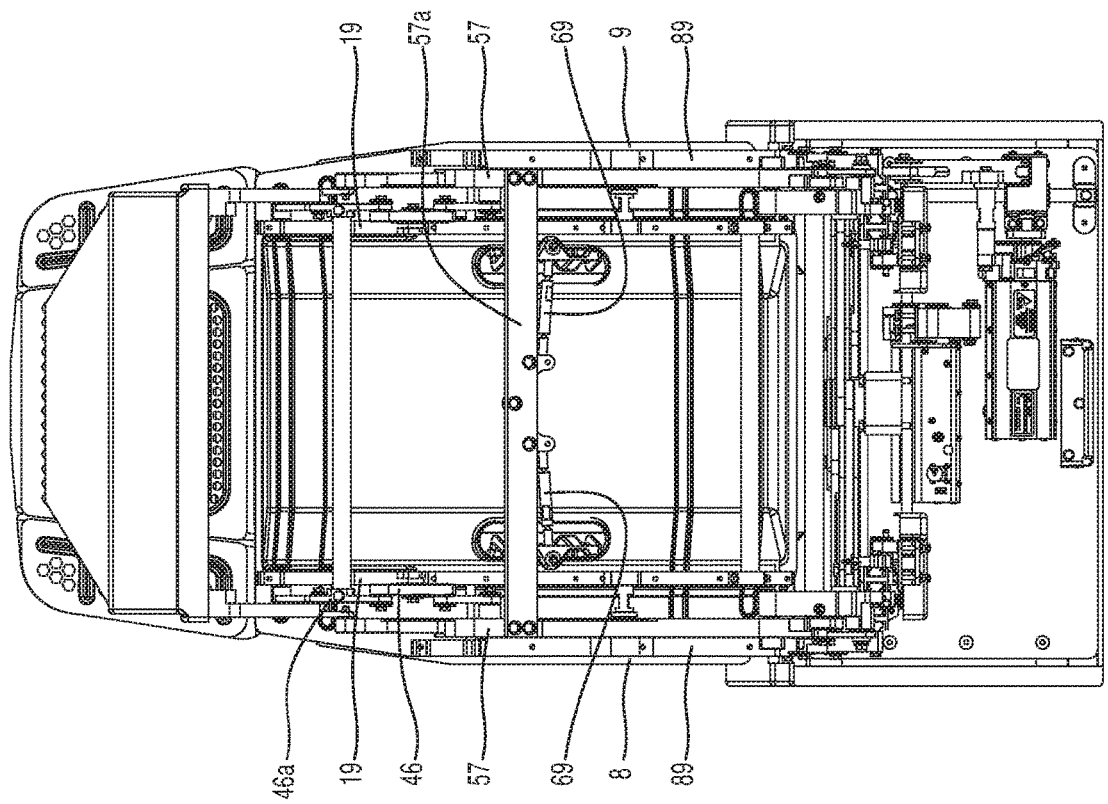

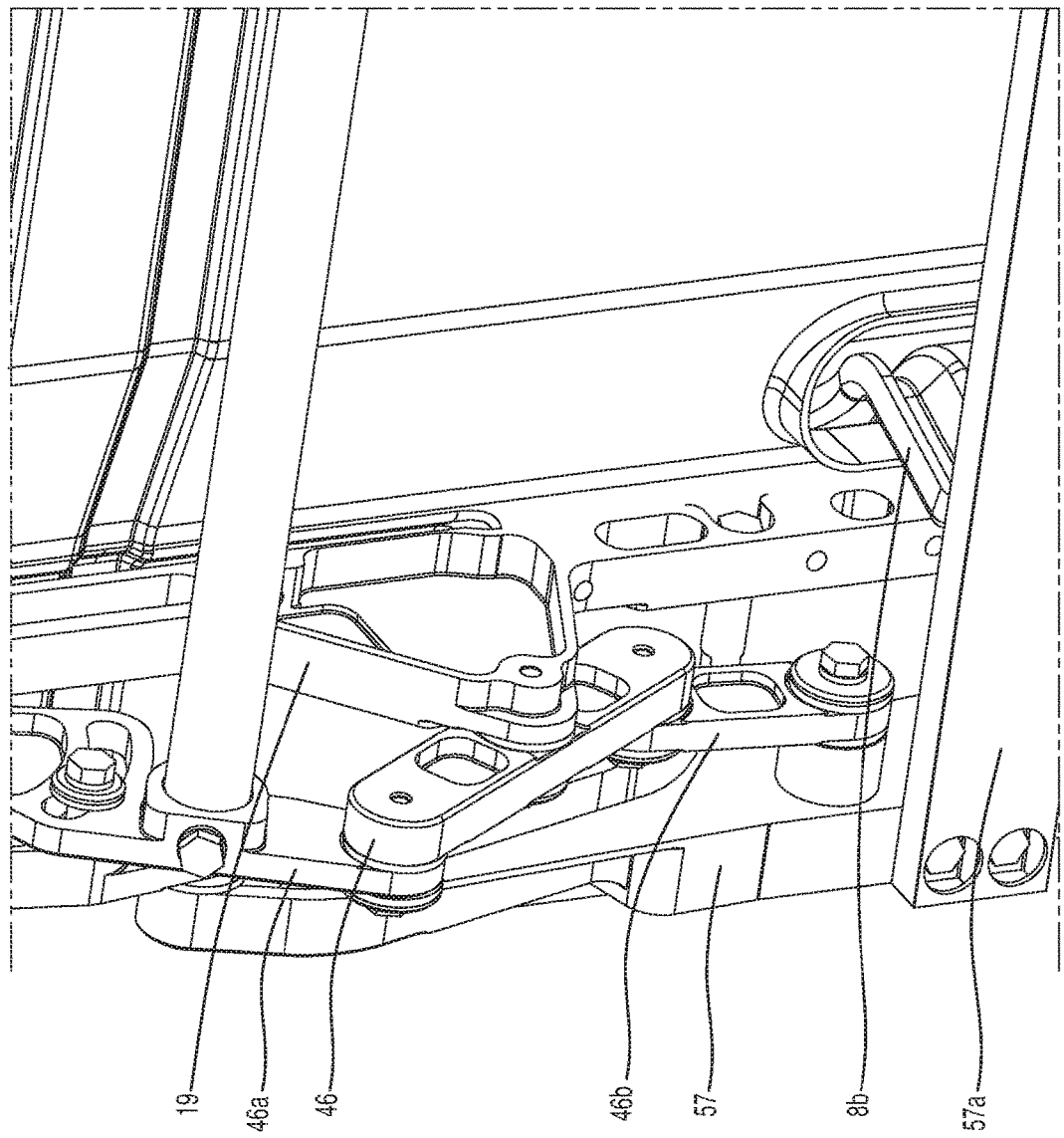

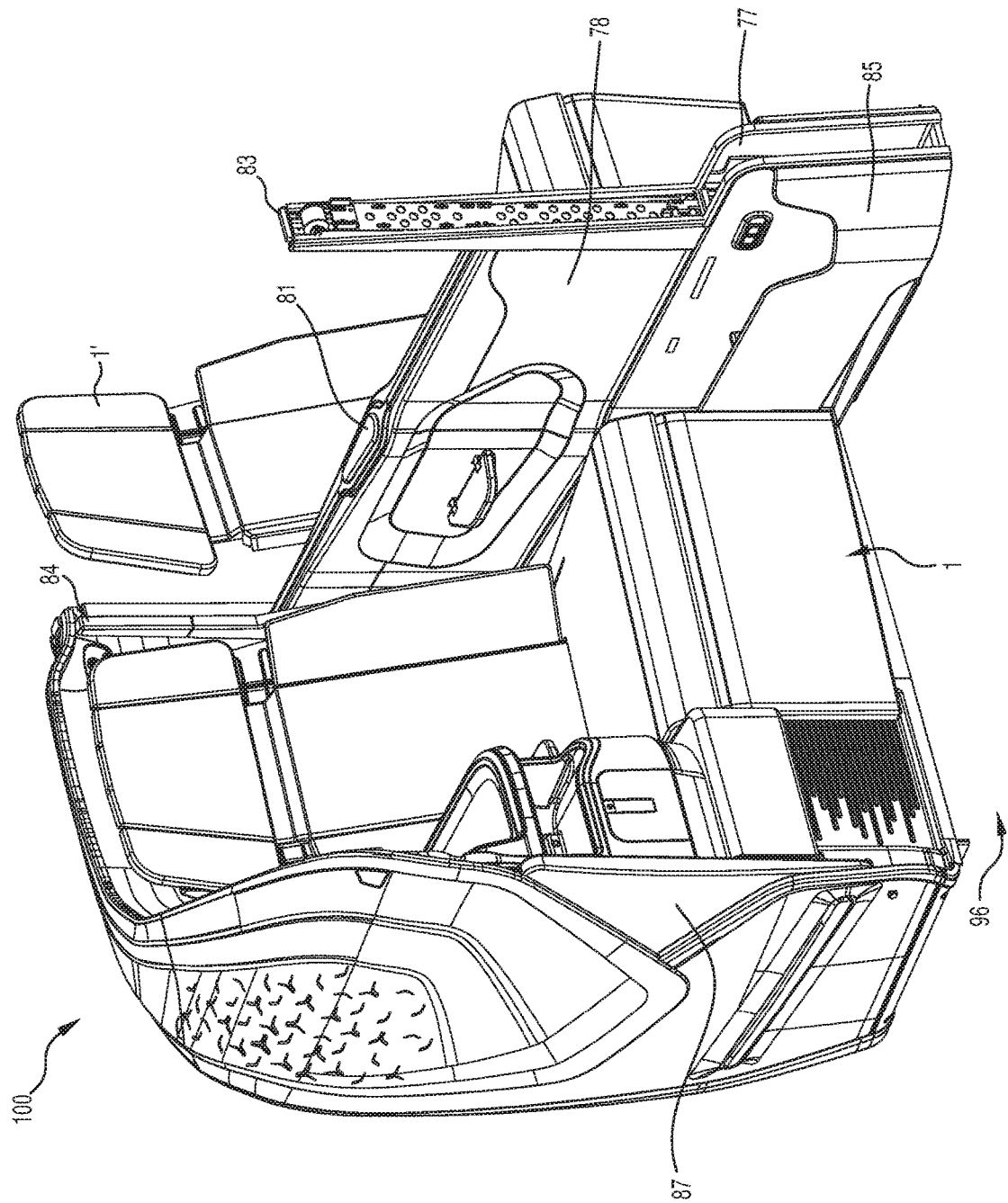

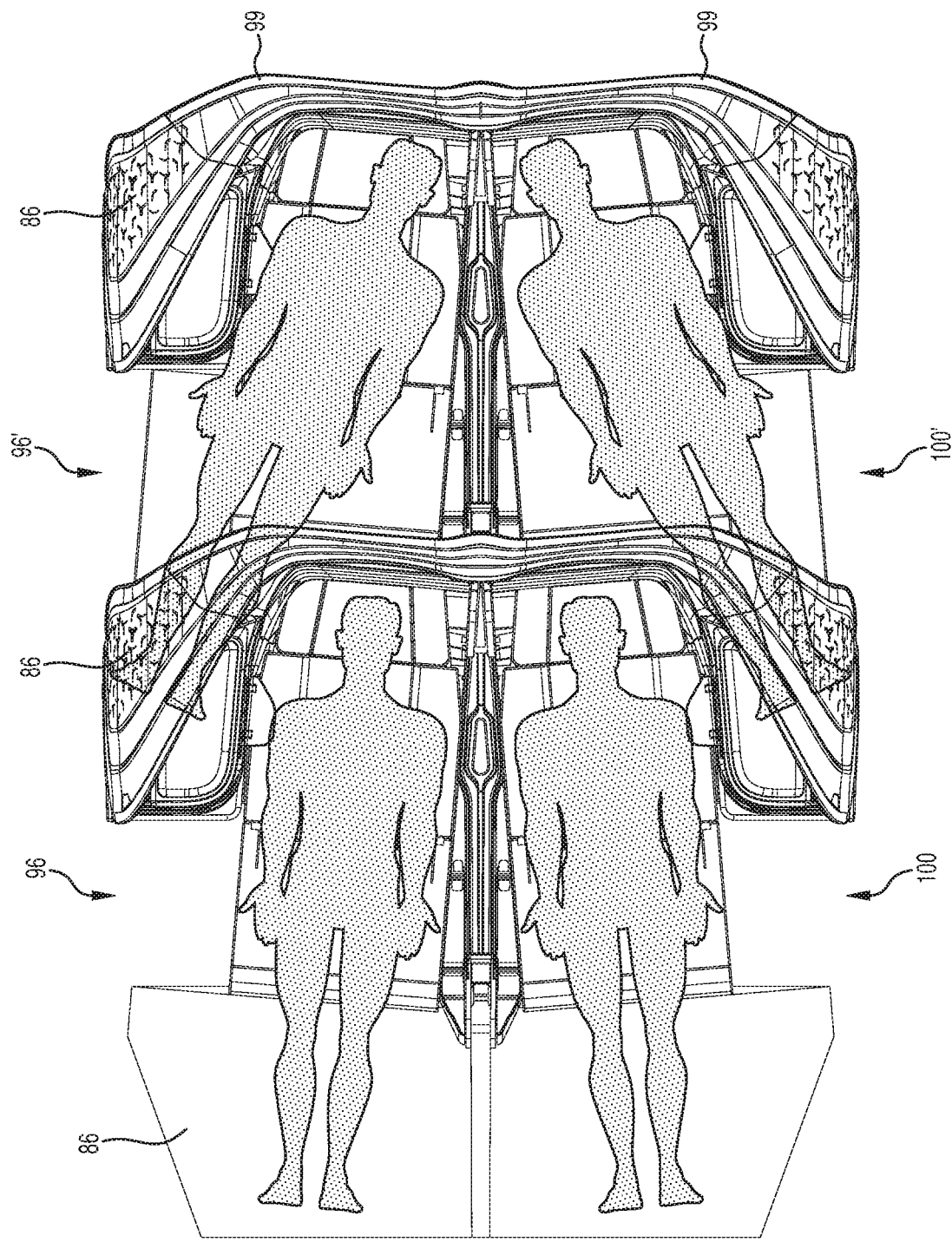

AIRCRAFT SEAT

TECHNICAL FIELD

The invention relates to a drive mechanism for a seat.

The invention also relates to a privacy screen for deployment between two seats.

The invention relates particularly although not exclusively to a drive mechanism for an aircraft seat and a privacy screen for deployment between a pair of aircraft seats.

BACKGROUND

Over the duration of a flight passengers may be seeking an opportunity to work, sleep, eat, or simply relax. These increasing demands from passengers cannot compromise the safety of an aircraft seat or the strict guidelines set down by aviation bodies to ensure that the structural integrity of a seat is not compromised on take-off or landing.

A further consideration when designing aircraft seats is the restrictive weight and volume requirements that must be met. Excessive weight will ultimately compromise an aircraft's range and excessive volume will restrict the number of passengers an aircraft can transport, with a potential negative impact on competitive pricing.

Further factors influencing seating on aircrafts is a passenger's ability to interact with adjacent passengers or conversely to avoid interaction with adjacent passengers.

All of the above considerations must be tempered with the ergonomic demand for comfort in a single seat design that will cater for passengers from 4 ft to 7 ft and over a weight range of 20 kg to 150 kg.

The current invention was conceived with these competing factors in mind.

SUMMARY OF THE INVENTION

The seat of the invention comprises a moveable seat carriage having a seat pan and a seat back supported thereon; a seat base supporting the moveable seat carriage thereupon; a support member moveable between a retracted configuration and an extended configuration, wherein a first end of the support member is coupled to the moveable seat carriage and a second end of the support member is coupled to the seat base; and an actuator to move the moveable seat carriage relative to the seat base to thereby transition the seat between an upright position and a reclined position, with the movement of the seat carriage driving the support member between the retracted configuration and the extended configuration, wherein the support member stiffens the seat as the seat transitions away from the upright to the reclined position and while in the reclined position.

The support mechanism may be a scissor mechanism.

The scissor mechanism may include a primary pair of arms coupled together for pivoting movement about an axis extending perpendicular to a plane of each of the primary pair of arms between the extended configuration in which the primary pair of arms lie substantially on top of each other parallel to the first direction and the retracted configuration in which the primary pair of arms lie substantially on top of each other perpendicular to the first direction; and wherein the first ends of each of the primary pair of arms are coupled with the seat base and the second ends of each of the primary pair of arms are coupled with the seat carriage.

The axis may bisect each of the primary pair of arms between a first end and a second end of each arm.

The actuator may comprise a motor. The actuator may comprise an electric motor.

The scissor mechanism may comprise a secondary pair of arms, the secondary pair of arms being pivotally connected to one another at first ends thereof to form a V-shaped arrangement when viewed in plan view, each second end of the secondary pair of arms being pivotally connected to one of each of the first ends of the primary pair of arms, respectively such that the first ends of the primary pair of arms are coupled to the seat base via the secondary pair of arms.

The scissor mechanism may comprise a tertiary pair of arms, the tertiary pair of arms being pivotally connected to one another at first ends thereof to form a V-shaped arrangement when viewed in plan view, each second end of the tertiary pair of arms being pivotally connected to one of each of the second ends of the primary pair of arms, respectively such that the second ends of the primary pair of arms are coupled to with the seat carriage via the tertiary pair of arms.

The seat may be configurable in three discrete configurations, upright mode, reclined mode and bed mode. The above-described term "upright position" is understood herein to include the upright mode. The above-described term "reclined position" is understood herein to include the reclined mode and the bed mode.

Bed mode may comprise all portions of the seat to be oriented in a substantially flat configuration.

The seat may be configurable in multiple intermediary configurations between the three discrete configurations described herein.

The moveable seat carriage and the seat pan may comprise complementary seat frames which support the seat pan and the seat back.

The seat frame may comprise a cam surface and the seat pan frame may comprise a cam follower, with the cam follower movably supported on the cam surface, such that movement of the seat pan frame relative to the seat frame follows the cam surface to vary orientation of the seat pan frame.

The seat back may be pivotally connected to the seat pan, such that movement of the seat pan causes movement of the seat back.

A deployment mechanism may be connected to the seat back, such that as the movable seat carriage moves away from the seat base, the deployment mechanism is caused to move a pair of wings mounted to the seat back.

By linking the wing deployment mechanism to be driven by movement of the moveable seat carriage, the volume, cost and weight of additional motors to drive the deployment mechanism are eliminated. The complexity of the seat is further reduced with fewer motors/actuators to maintain, repair and replace.

The pair of wings may be coupled on opposing sides of the seat back and may be configured to move between an operative position where the wings extend from the seat back in an angled configuration, and a storage position where the wings extend in alignment with the seat back to provide a substantially flat seat back.

The wings may be maintained in an operative position for all seating configurations.

The wings may be maintained in a storage position for only the fully flat configuration of the seat.

The wing deployment mechanism may comprise a pair of telescoping members, an outboard end of each being respectively coupled to one of the pair of wings on the seat back.

The outboard ends of each of the pair of telescoping members may be coupled with each of the wings respectively, such that movement of the movable seat carriage away from the seat base causes the telescoping members to urge the wings of the seat back into the operative position.

Each wing may comprise a front portion, that is located on a passenger facing side of the seat and a rear portion that is located on a non-passenger facing side, or rear side, of the seat.

The front portion of each wing may be rigidly connected to the rear portion of each wing, wherein the rear portion extends through the seat, such that movement of the rear portion of the wing moves the front portion of the wing.

The outboard end of each of the pair of telescoping members engages with the respective rear portions of the wing to drive the wings between the storage position and the operative position.

An arched track may be integrated into the seat back frame to define a travel path of the wings between the storage and operative positions. The arched track may be formed independently of the seat back frame and coupled thereto by means of a fastener, bolt, pin, adhesive, rotating joint, hinged joint and welding.

An armature may extend along the seat-back, the armature configured to respond to movement of the movable seat carriage and thereby effect movement of the outboard ends of each of the telescoping members along the arched track to move the wings between the operative position and the storage position.

An inboard end of each of the pair of telescoping members may be movably mounted to the seat back frame, such that when the movable seat carriage moves the seat to a bed mode the telescoping members urge the wings into the storage position.

An outboard end of each of the pair of telescoping members may be coupled with each of the wings respectively, such that movement of the movable seat carriage towards the seat base causes the telescoping members to urge the wings of the seat back into the operative position.

The seat described herein may be an aircraft seat; a train seat, a tram seat; a domestic seat, a cinema seat, a restaurant seat, a massage seat.

The invention further provides a privacy screen for separating two adjacent seating locations on an aircraft, wherein the privacy screen is movably configured to provide an open mode, a partially-open mode and a closed mode.

The privacy screen may comprise two members. The privacy screen may comprise three members. The privacy screen may comprise a base member, an intermediate member and an upper member.

The upper member may be configured to be telescopically extended and retracted from the intermediate member. The upper member and the intermediate member may be configured to be telescopically extended and retracted from the base member. The upper member and the intermediate member may be configured to be telescopically extended and retracted from the base member contemporaneously.

In the open mode, the upper member and the intermediate member may be fully retracted into the base member, such that an uppermost surface of the privacy screen is substantially level with a seat pan of an adjacent seat.

The privacy screen may be situated between a pair of seats configurable in a bed mode, wherein placing the privacy screen in the open mode and placing each of the pair of seats in the bed mode provides the passenger of each seat with a double-bed experience.

A pair of guides may be provided in which the upper and intermediate members slidably translate. The pair of guides may be free-standing. At least one of the pair of guides may be incorporated into a shroud surrounding a seat. The shroud surrounding a seat defines a chamber.

Movement of the upper member or the intermediate member may physically effected by a passenger. Movement of the upper member or the intermediate member may be effected by an electric motor or actuator. Movement of the upper member or the intermediate member may be effected by a fluid actuated member. Movement of the upper member or the intermediate member may be effected by a gas strut.

Movement of the privacy screen may be effected by each of the passengers seated adjacent the privacy screen.

Each of the upper, intermediate and base members of the privacy screen may extend wholly across one side of the chamber.

The privacy screen in a closed mode may prohibit visual and physical contact between two passengers seated adjacent the privacy screen.

The privacy screen in an open mode may facilitate physical and visual contact between two passengers seated adjacent the privacy screen.

A storage compartment may be incorporated into at least one of the base member, the intermediate member and the upper member.

The invention further provides a support member for a seat, the support member comprising: a scissor mechanism including a primary pair of arms coupled together for pivoting movement about an axis extending perpendicular to a plane of each of the primary pair of arms between an extended configuration in which the primary pair of arms lie substantially on top of each other parallel to the first direction and a retracted configuration in which the primary pair of arms lie substantially on top of each other perpendicular to the first direction; and wherein in use the first ends of each of the primary pair of arms are coupled with a seat base and the second ends of each of the primary pair of arms are coupled with a moveable seat carriage, such that, movement of the moveable seat carriage away from the seat base causes movement of the scissor mechanism towards the extended configuration.

The axis may bisect each of the primary pair of arms between a first end and a second end of each arm.

The support member may comprise a secondary pair of arms, the secondary pair of arms pivotally connected to one another at first ends thereof to form a V-shaped arrangement when viewed in plan view; each second end of the secondary pair of arms being pivotally connected to one of each of the first ends of the primary pair of arms, respectively such that the first ends of the primary pair of arms are coupled with the seat base via the secondary pair of arms.

The support member may comprise a tertiary pair of arms, the tertiary pair of arms pivotally connected to one another at first ends thereof to form a V-shaped arrangement when viewed in plan view; each second end of the tertiary pair of arms being pivotally connected to one of each of the second ends of the primary pair of arms, respectively such that the second ends of the primary pair of arms are coupled with the seat carriage via the tertiary pair of arms.

The invention also provides an aircraft with a passenger cabin that includes a plurality of the above-described seat.

Various features, aspects, and advantages of the invention will become more apparent from the following description of embodiments of the invention, along with the accompanying drawings in which like numerals represent like components.

BRIEF DESCRIPTION OF THE DRAWINGS

Embodiments of the invention are illustrated by way of example, and not by way of limitation, with reference to the accompanying drawings, of which:

FIGS. 1A-1C illustrate side views of an aircraft seat in three configurations; an upright configuration for take-off and landing; a reclined configuration; and a substantially flat configuration according to one embodiment of the invention;

FIG. 17A is a rear view of the seat in an upright configuration, illustrating a series of linkages between the seat pan and the seat back;

FIG. 17C is an enlarged view of an over-centre link for activating movement of the head rest of the seat;

FIG. 20B is a view of the central seating pair of FIG. 20A with the central privacy screen in a "partially open" mode;

FIG. 21 is a schematic plan view of a forward most central seating pair and a subsequent seating pair, illustrating two different orientations for passenger sleeping positions, with each of the seats in a substantially flat configuration.

Figure 1D:
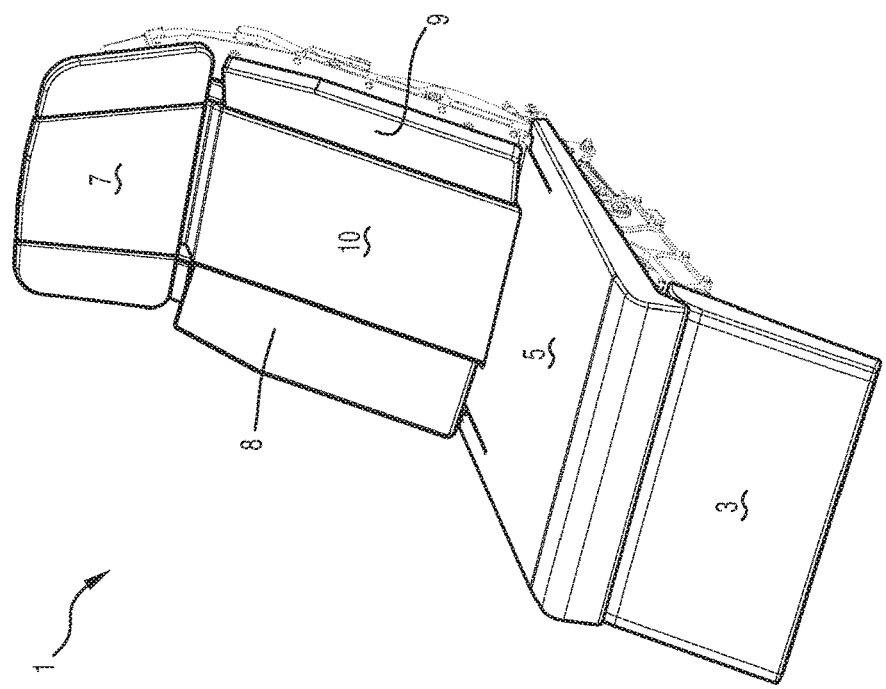
FIG. 1D illustrates a perspective view of an aircraft seat in a partially reclined configuration.

The invention will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION

The invention will now be described more fully hereinafter with reference to the accompanying drawings, in which various embodiments, although not the only possible embodiments, of the invention are shown. The invention may be embodied in many different forms and should not be construed as being limited to the embodiments described below.

While the invention is described herein in relation to an aircraft seat, the invention is also applicable to seats for cars, trains, buses, trams and all manner of vehicles and to seats for homes, offices, restaurants and the like.

The following terms are understood herein to have the following meanings:
"forward" is a direction towards a front of an aircraft;
"rearwards" is a direction towards a rear end of the aircraft;
"upwards" is a direction towards a ceiling of a cabin;
"downwards" is a direction towards a floor of the cabin;
"seat pan" is a portion of a seat that a user sits upon, this is also referred to sometime as the "squab"; and
"seat back" is a portion of a seat that is in contact with and supporting a user's back.

Referring generally to the Figures there is illustrated a seat 1 comprising:
(a) a moveable seat carriage 20 having a seat pan 5 and a seat back 10 supported thereon;
(b) a seat base 15 rigidly mounted to support the moveable seat carriage 20 thereupon;
(c) a seat support member 25 moveable between a retracted configuration and an extended configuration, wherein a first end of the support member 25 is coupled to the moveable seat carriage 20 and a second end of the support member 25 is coupled to the seat base 15; and
(d) an actuator 73 to move the moveable seat carriage 20 relative to the seat base 15 to thereby transition the seat 1 between an upright position and a reclined position, with the movement of the seat carriage 20 driving the support member 25 between the retracted configuration and the extended configuration, wherein the support member 25 stiffens the seat 1 as the seat transitions away from the upright to the reclined position and while in the reclined position.

The support member 25 may comprise a scissor mechanism 26. In use, extension of the scissor mechanism 26 between the retracted and the extended configurations is driven by movement of the seat carriage 20 away from the seat base 15 and retraction of the scissor mechanism 26 from the extended configuration towards the retracted configuration is driven by movement of the seat carriage 20 towards the seat base 15, thereby driving the seat 1 between an upright configuration and a flat configuration.

Figure 1C:
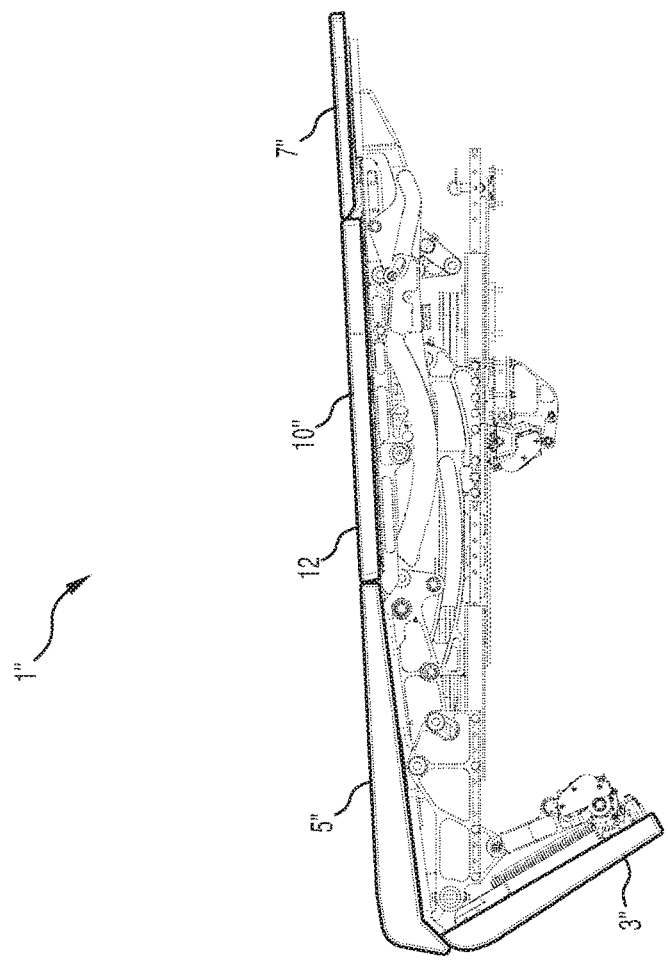

FIGS. 1A-1D illustrate the seat 1 with the seat pan 5 movably mounted to the seat back 10, a head rest 7 and a lower leg support 3. The head rest 7 is movably mounted to the seat back 10 and the lower leg support 3 is moveably mounted to the seat pan 5. In FIGS. 1A-1c, the seat 1 is illustrated in each of an upright configuration (1A), a reclining configuration (1B) and a substantially flat configuration (1C).

The upright configuration of the seat 1 can be referred to as "take-off/landing" (TOL) configuration as this is the default configuration in which the seat 1 is placed when the aircraft is taking-off and landing. This is also the configuration in which the primary safety tests are conducted on the seat 1 to ensure safety and regulatory compliance.

In the upright configuration of FIG. 1A the seat back 10 is curved ergonomically across a width thereof. The seat back 10 includes a pair of wings. A first wing 8 (not shown in FIG. 1A) is positioned on a first side of the seat back 10 and a second wing 9 shown in FIG. 1A is positioned on an opposing, second side of the seat back 10. The wings 8, 9 are pivotally coupled with the seat back 10 and can articulate between an elevated, operative position, where the distal ends 8a, 9a of the wings 8, 9 extend forward across the seat pan 5 in an outwards and slightly curved manner to hug the passenger; and a storage position where the wings 8, 9 are substantially in-line with the seat back 10 to provide a flat surface 12 across the seat back 10.

The embodiments and features of the seat 1 will be referred to herein in reference to the three configurations outlined above (1A, 1B and 10). However, it should be noted, that these are discrete configurations selected to exemplify the features of the seat 1. The movement and articulation of the seat 1 as described herein can be set and locked in myriad configurations between each of the three exemplary configurations.

Figure 2:
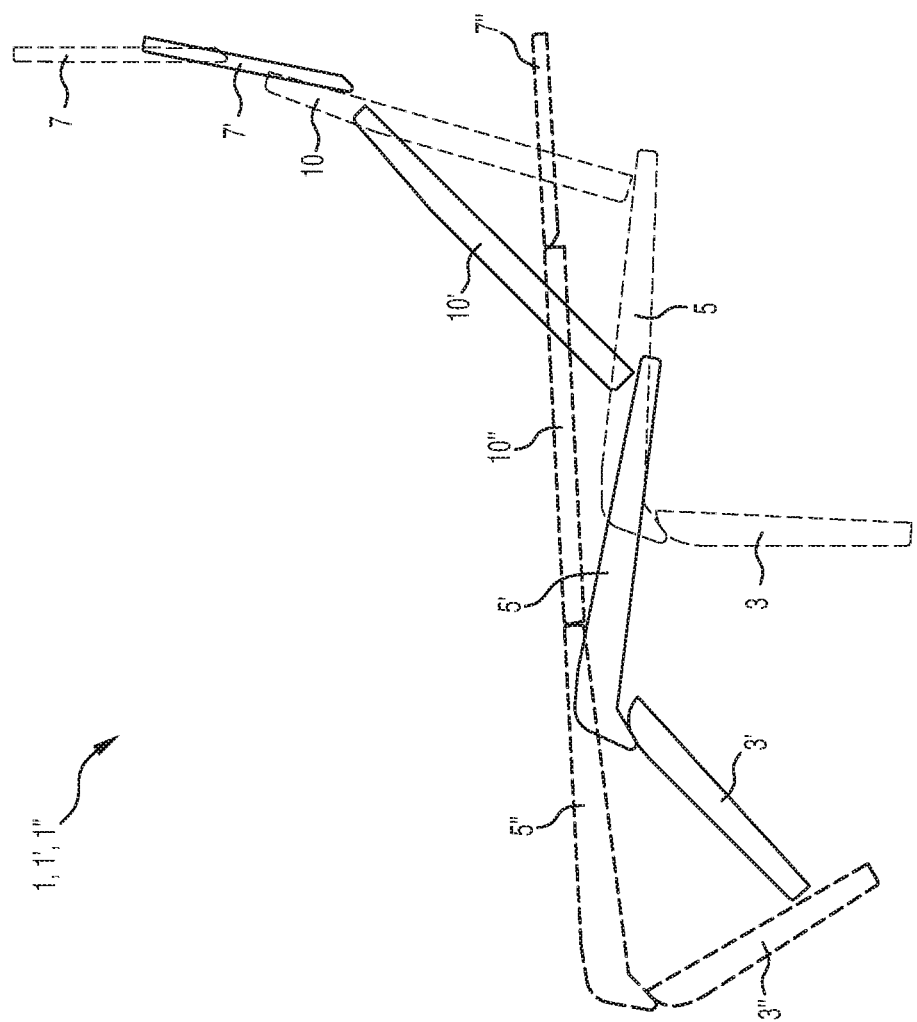
FIG. 2 is a sectional side view of the aircraft seat of FIGS. 1A-C in three distinct configurations, superimposed, to illustrate the range of motion through which the seat can travel.

FIG. 2 illustrates comparatively the articulation between the four primary seat components: seat pan 5, 5', 5", seat back 10, 10', 10", head rest 7, 7', 7" and lower leg support 3, 3', 3". As shown in FIG. 2, not only do the four components of the seat 1 articulate relative to one another, but the entire seat 1 is movably mounted to the seat base 15 (not illustrated in FIG. 2) which is fixed to the floor of the aircraft.

Figure 3:
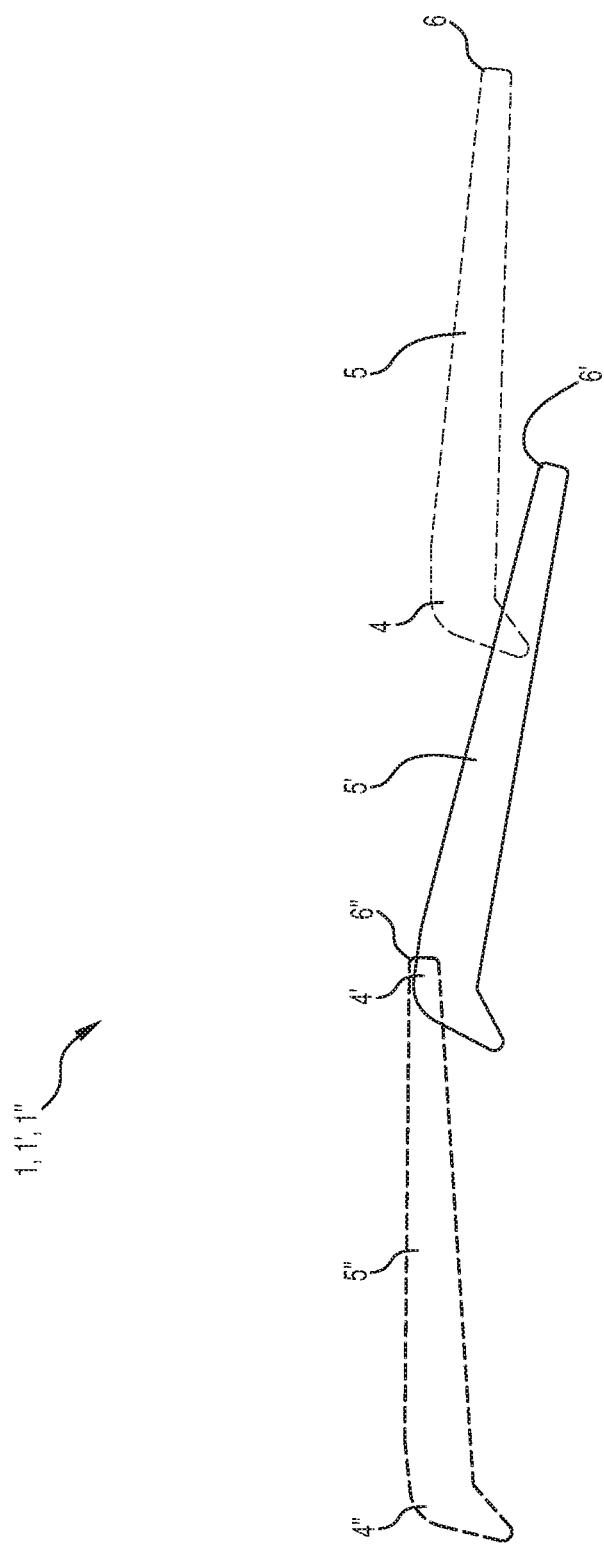
FIG. 3 is a sectional side view of a seat pan cushion of the seat of FIGS. 1A-C in three distinct configurations, superimposed on each other, to illustrate the range of motion through which the seat pan cushion can travel.

FIG. 3 illustrates the seat pan 5, 5', 5" in each of the three configurations. In addition to a translational motion in a first or forwards direction, (towards the lower leg support 3) the inclination of the seat pan 5, in relation to horizontal, also varies.

The term "horizontal" is understood herein to refer to a direction substantially parallel to a cabin floor 98 of the aircraft, as perceived by a passenger thereon. Accordingly, it is understood that as the aircraft ascends and descends the passenger's perception of horizontal within the aircraft has not visually changed.

In the flat configuration (1C) of FIG. 3, the seat pan 5" can be seen to be horizontal, or substantially horizontal to the floor 98 of the aircraft. This then provides a comfortable and natural angle for a passenger to sleep. As the seat pan 5" moves from the flat configuration towards the reclined configuration (1B), the entire seat pan 5' moves rearwards and inclines such that a rear portion 6' of the seat pan 5' dips downwards pushing a forward portion 4' of the seat pan 5' upwards. As the seat pan 5' continues to move rearwards towards the upright configuration (1A) the seat pan 5 reduces its angle of inclination relative to the floor 98 of the aircraft, such that the rear 6 of the seat pan 5 rises upwards and the forward portion 4 of the seat pan 5 is lowered. In this manner the seat is designed to provide comfort to a passenger thereon as the seat 1 mimics the ergonomic movements of the passenger's body as they transition between an upright seating position and recumbent or supine position.

The seat 1 is located within a seat pod 100. The pod 100 defines a volume which accommodates articulation of each seat 1 between substantially flat and upright configurations. As the seat 1 transitions towards a flat configuration the seat pan 5 translates forwards within the volume of the pod 100, thus creating the necessary space behind the seat pan 5 for the seat back 10 and headrest 7 to occupy.

Figure 4:
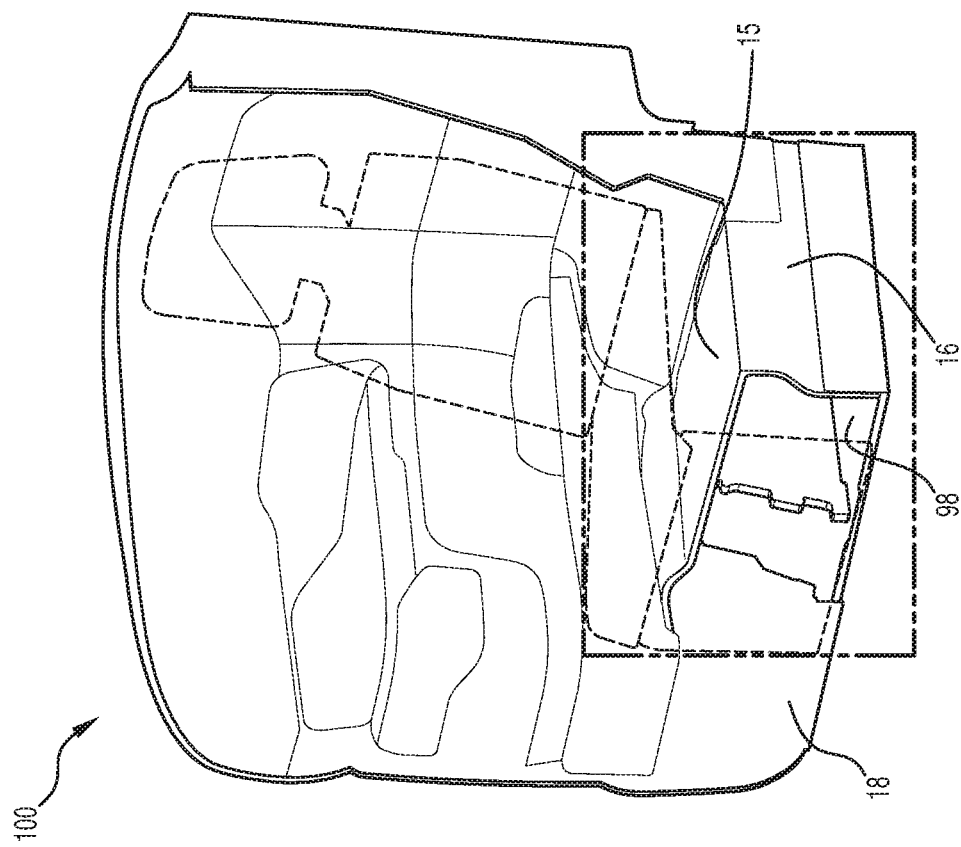
FIG. 4 is a perspective view of a seat chamber for receiving and supporting the seat of FIG. 1, the chamber illustrates a seating zone and a footwell, for use by a passenger seated behind the illustrated seat chamber.

To facilitate the required movement of the seat 1 relative to the fixed seat base 15, the seat base 15 is configured as a frame that directly mounts to the cabin floor 98 (as illustrated in FIG. 4) or can comprise an upper base frame 16. The upper base frame 16 is typically configured as a rigid shell upon which the seat 1 is supported. The upper base frame 16 thus provides a stowage compartment 18 (illustrated in FIG. 4), or a plurality of stowage compartments under the seat 1. The or these compartments 18 can be utilised by an aircraft for packaging space for electronics, or a storage space for lifejackets, or used by a passenger for luggage storage, readily accessible from their seated position.

Figure 5:
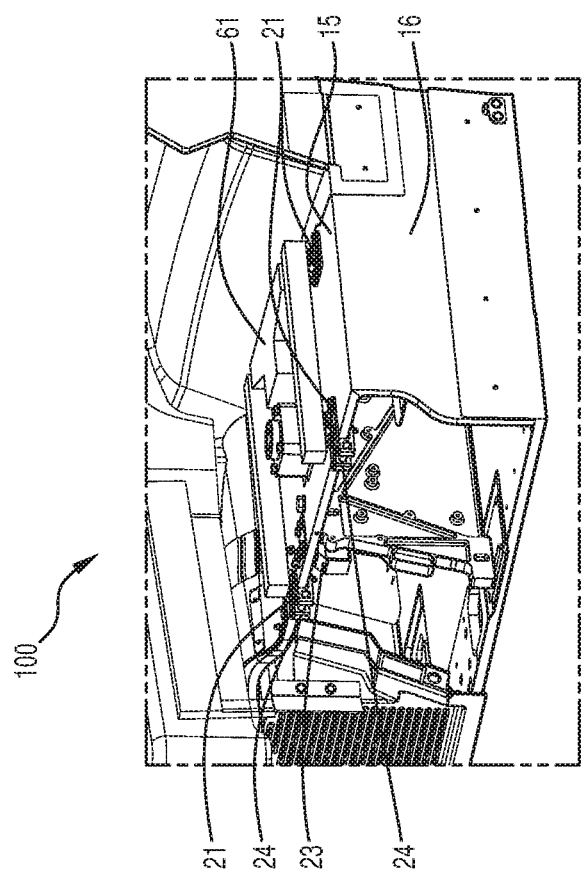
FIG. 5 is a perspective view of a base of the seat chamber of FIG. 4, illustrating a rail and motor mechanism for engaging and driving the seat of FIG. 1 relative to the base of the seat chamber of FIG. 4.

To facilitate movement of the seat 1 relative to the seat base 15, the seat 1 comprises a moveable seat carriage 20 having the seat pan 5 and the seat back 10 supported thereon. The seat base 15 comprises the upper base frame 16 to support the moveable seat carriage 20 thereupon, as illustrated in FIG. 5.

Also supported upon the seat base 15 is an actuator mechanism 2 to move the seat carriage 20 relative to the seat base 15. The actuator mechanism 2 moves the moveable seat carriage 20 away from and back towards the seat base 15.

Also mounted to the seat base 15 is a motor mount 23 and actuator mounts 24. The mounts 23, 24 may be separate mounting members. Alternatively, mounts 23, 24 can be integrated into mounting brackets 21 for the seat mount rails 22. Combining the required brackets/mounts means in this manner can save additional weight in the seat 1.

Figure 6:
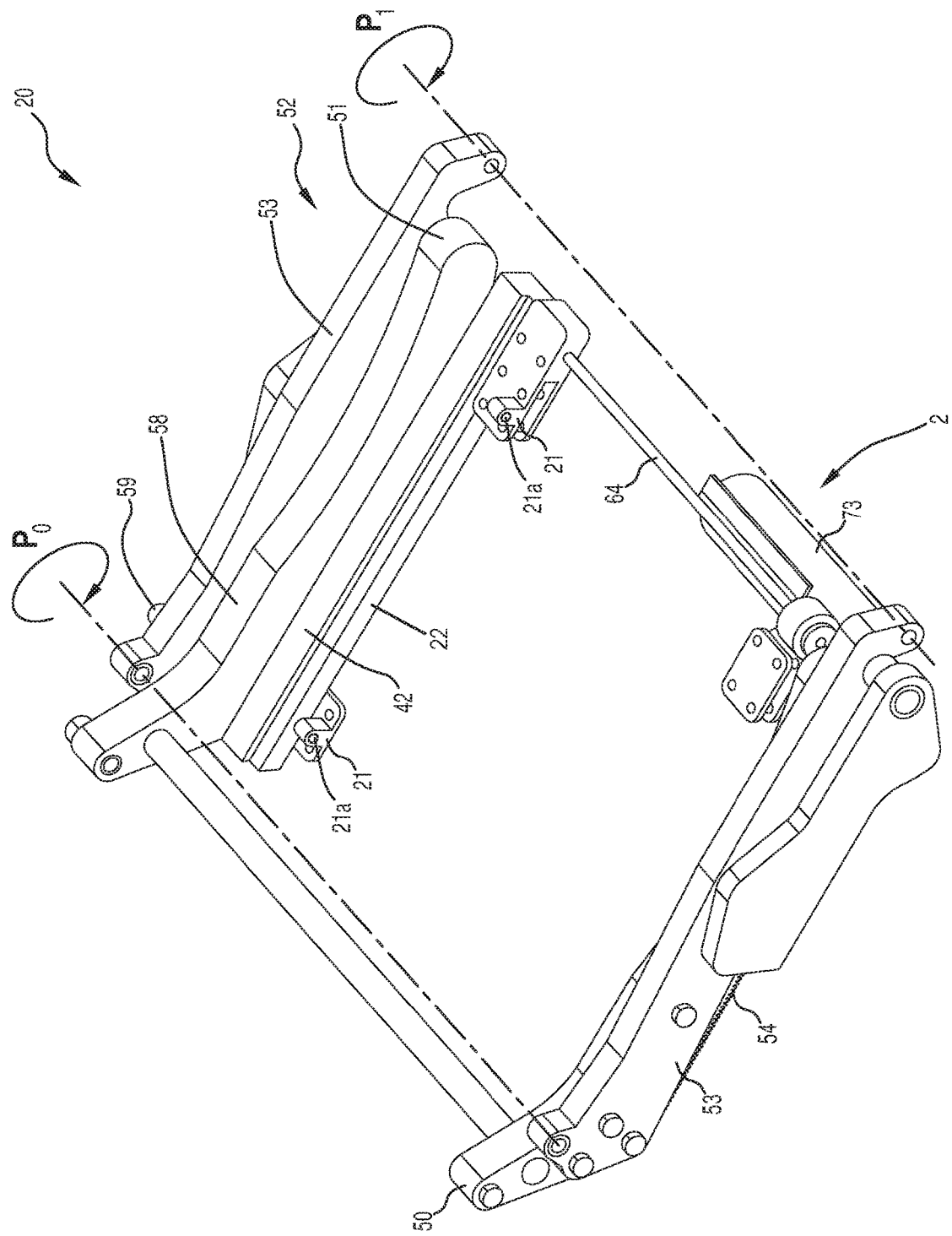
FIG. 6 is a seat carriage upon which the seat of FIG. 1 is movably supported, for movably engaging with the rail and motor mechanism of FIG. 5.

The actuator mechanism 2 comprises an actuator illustrated as a motor 73 (illustrated in FIG. 6). The motor 73 drives the seat carriage 20 away from the seat base 15 which consequently drives the seat support member 25 from the retracted configuration towards the extended configuration as the seat pan frame 52 and associated seat back frame 57 move relative to the seat frame 50. When the seat 1 is driven out of the upright configuration, the seat support member 25 provides support to the reclined seat 1 to support a passenger's weight through the seat base 15 via the offset seat pan 5. The further the seat carriage 20 moves away from the seat base 15, the greater the offset between the passenger's weight on the seat pan 5 and the seat base 15. This offset loading creates a moment about the seat base 15. As the passenger's weight moves away from the seat base 15, the moment increases which in turn increases the loading on the seat 1. To improve stiffness of the seat 1 in any of the extended configurations, the seat support member 25 provides an extendable backbone that runs along a central axis of the seat 1. The seat support member 25 provides increased stability to the seat 1 more evenly distributing loads through the seat 1. Furthermore, increasing the stiffness and stability of the seat 1 in any of its extended configurations provides a more sturdy and solid feel to the seat 1 giving the passenger more support and an improved flight experience.

Seat Carriage

FIG. 6 illustrates the carriage 20 in isolation from the remainder of the internal seat structure.

The carriage 20 comprises a seat frame 50 and a seat pan frame 52. The seat frame 50 includes a pair of spaced apart rails 51 that are adapted to move across the seat base 15. The seat frame 50 supports each of the seat pan 5 and seat back 10 thereon, and facilitates rotational movement between the seat pan 5 and seat back 10 in combination with translational movement relative to the seat base 15.

Figure 11:
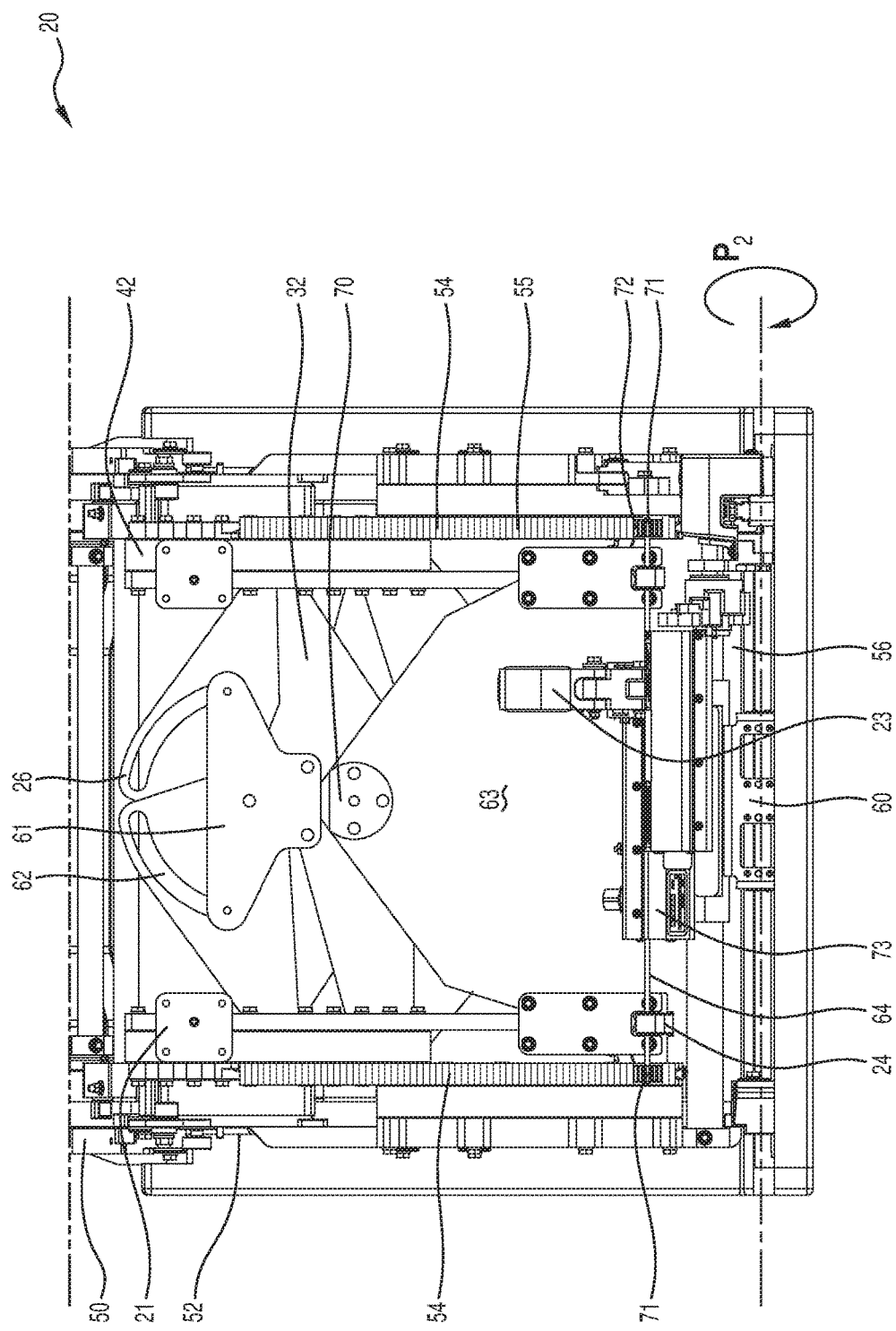
FIG. 11 is a bottom view of the scissor mechanism of FIG. 8 illustrated within the seat carriage of FIG. 6.

Each of the seat frame rails 51 provides a rack 54 providing a plurality of teeth 55 for engagement with at least one pinion gear 71 to facilitate movement of the carriage 20. It is however contemplated that a single rack and a single pinion gear could be used to drive the carriage 20 effectively. As illustrated in FIG. 11 a pair of pinion gears 71 are coupled with a pair of racks 54, each rack and pinion positioned towards an outboard side of the carriage 20. The actuator mechanism 2 for driving the carriage 20 will be described in further detail herein. The rack 54 and pinion gear 71 can be reversibly mounted between the seat base 15 and the carriage 20. For example, the rack 54 may be part of the seat base 15 or the carriage 20, wherein the pinion gear 71 is drivably mounted to the other of the seat base 15 or the carriage 20.

The rack 54 is disposed on an underside of the seat frame rails 51, more clearly illustrated in FIG. 11. The teeth 55 of the rack 54 project outwardly from the underside of the seat frame rails 51 to be accessible to the pinion gears 71 located under the seat carriage 20 affixed to the seat base 15.

In FIG. 6, the seat mount rails 22 are rigidly mounted to the seat base 15 (not illustrated) via four rail mount brackets 21 that bolt or rivet directly into the upper base frame 16. Each of the rail mount brackets 21 provides a base portion for affixing to the seat base 15 and an upper portion for receiving a mounting pin 21a. The actuator mechanism 2, including the driven pinion gears 71, is mounted to the seat mount rails 22 to drive the racks 54 and adjoined seat frame 50 across the seat base 15. A plurality of teeth 72 circumferentially disposed about the pinion gear 71 project outwardly from the pinion gear 71 to meshingly engage with the teeth 55 of the racks 54 of the seat frame rails 51 (see FIG. 11). The seat frame 50 and the carriage 20 are driven across the seat base 15 in a linear motion forwards and backwards.

The seat-pan frame 52 supports the seat pan 5 and carries a significant proportion of the passenger's weight when the seat 1 is in the upright configuration. This is because the passenger's load is reacted through the H-point. The H-point is the "theoretical, relative location of a passenger's hip and more specifically, the point about which a passenger's torso pivots relative to the upper legs".

To move the seat 1 the actuator mechanism 2 is initiated, typically by the passenger, to drive the seat carriage 20 away from or towards the seat base 15.

To recline the seat 1 the actuator mechanism 2 (and motor 73) is initiated, typically by the passenger, to drive the seat 1 from an upright configuration towards a reclined configuration, and ultimately to the substantially flat configuration. This mechanism will be described more fully hereinafter.

As the seat 1 reclines, and moves away from the upright configuration (1A), a portion of the passenger's weight will be transferred increasingly onto the seat back 10 of the seat 1 and the H-point loading will be reduced. As the seat continues to recline towards the flat configuration (1C) more of the passenger's weight will be transferred from the H-point to be reacted by the lower leg support 3 and the head rest 7, by virtue of the passenger's legs and head, respectively. In the above described manner, the passenger's weight distribution across the seat 1 is constantly shifting as the seat changes configuration. A centre of gravity, through which the combined weight of the seat 1 and passenger is reacted is thus continuously shifting in relation to the seat base 15, either increasing or decreasing the offset of this load and varying the moment about the seat base 15. If the seat 1 is not adequately supported, this offset loading can cause a seat 1 to lose support giving the passenger a feeling that the seat 1 is flimsy or not substantial. Aside from discomfort this can lead to a perception of low quality that is not desirable.

Movably supported on the seat frame 50 is the seat-pan frame 52. The seat-pan frame 52 comprises a pair of spaced apart longitudinal rails 53 which are mounted to the seat frame 50. The seat-pan frame 52 supports a seat cushion (not illustrated) on which the passenger sits. The seat-pan frame 52 is driven back and forth across the seat frame 50 by the actuator mechanism 2, to adjust the location and orientation of the seat pan 5 relative to the carriage 20, this action extends and retracts the seat support member 25 to increase support as the seat carriage 20 moves further away from the seat base 15.

Figure 14A:
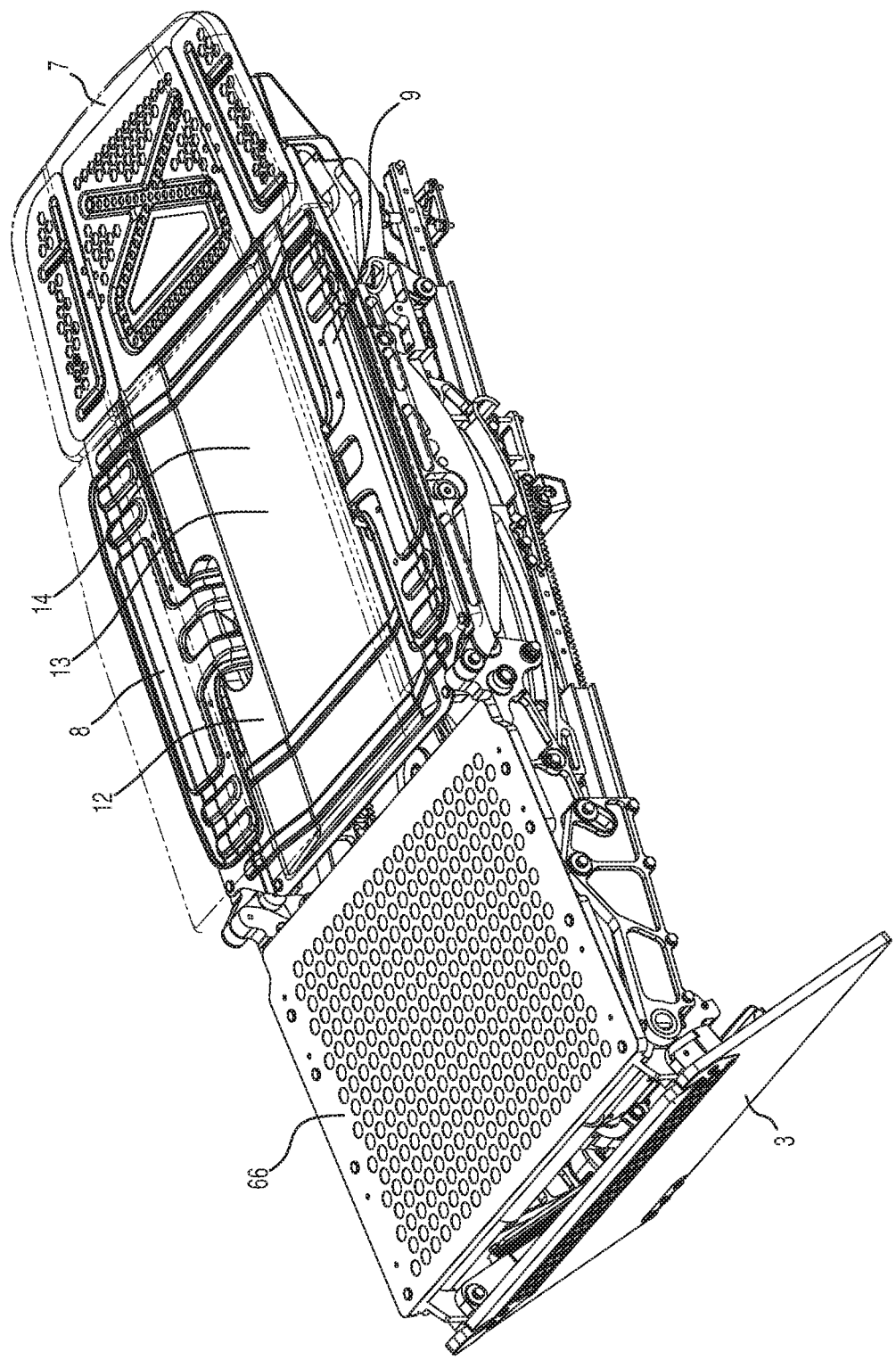
FIG. 14A is a perspective view of a seat pan, seat back and headrest assembly of an aircraft seat in a substantially flat configuration, illustrating opposing side-wing frames of the seat back in a stowed position.
Figure 14B:
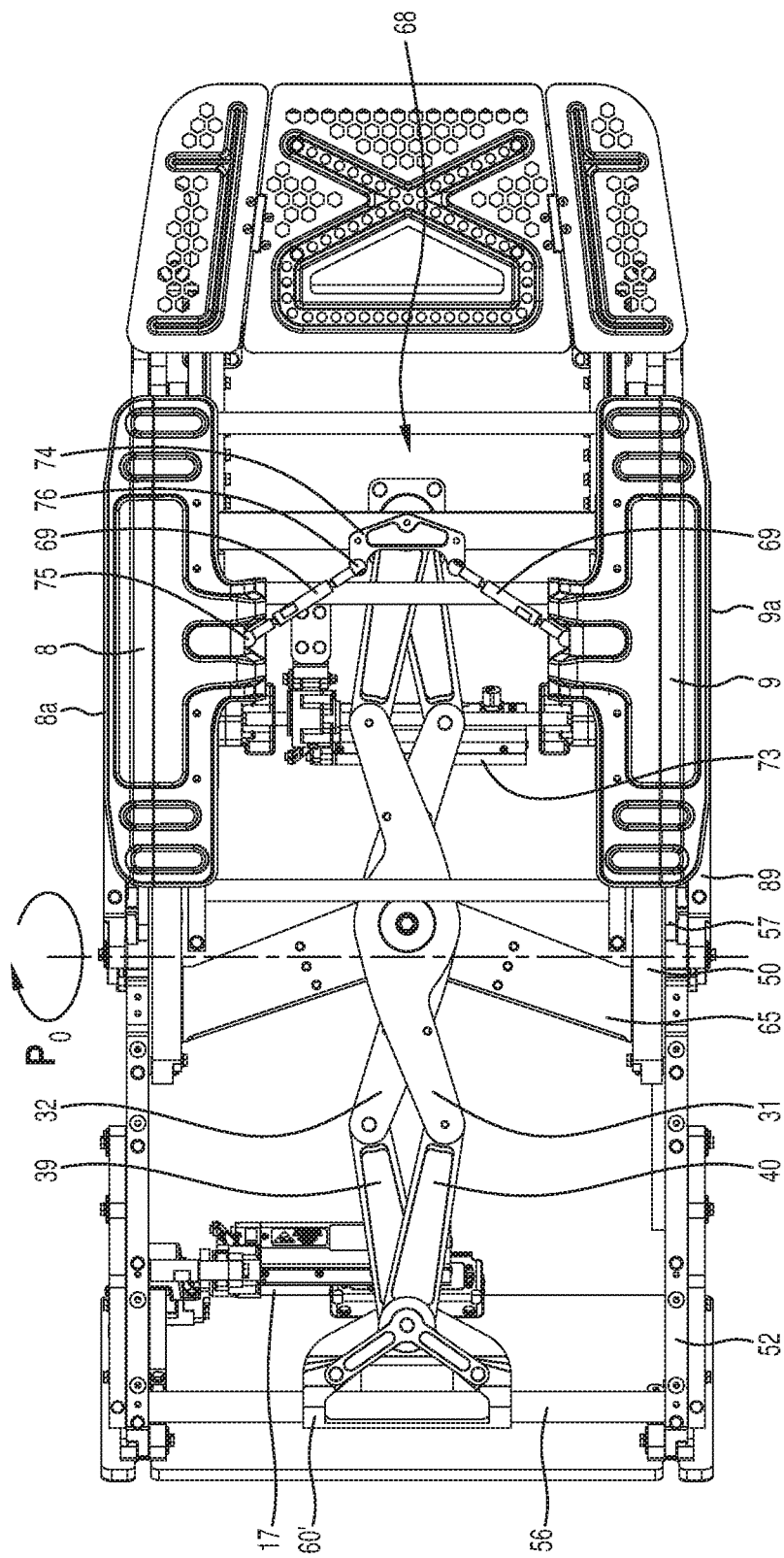
FIG. 14B is a top view of the fully extended scissor mechanism and seat pan frame in the substantially flat configuration, illustrating a lower leg support of the seat.
Figure 14C:
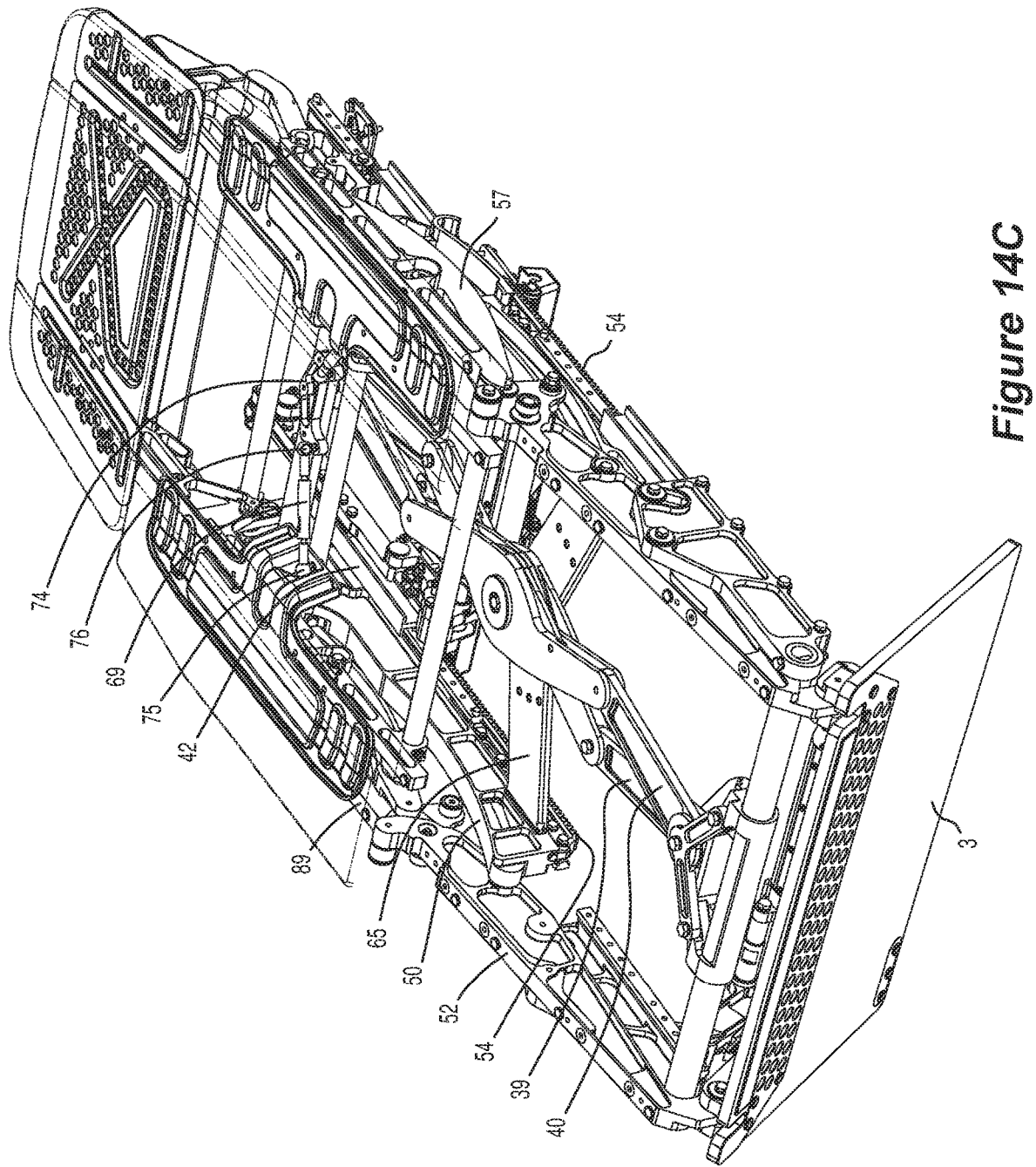
FIG. 14C is a perspective view of the fully extended scissor mechanism and stowed opposing side-wings of the seat back in the substantially flat configuration.

The seat-pan frame 52 is pivotally coupled to the seat-back frame 57 (illustrated in FIG. 14C). An axis Po defines the rotational axis between the seat-pan frame 52 and the seat-back frame 57. As the seat-pan frame 52 travels across the seat frame 50 the seat-back frame 57 attached thereto is also drawn across the seat frame 50.

Figure 8:
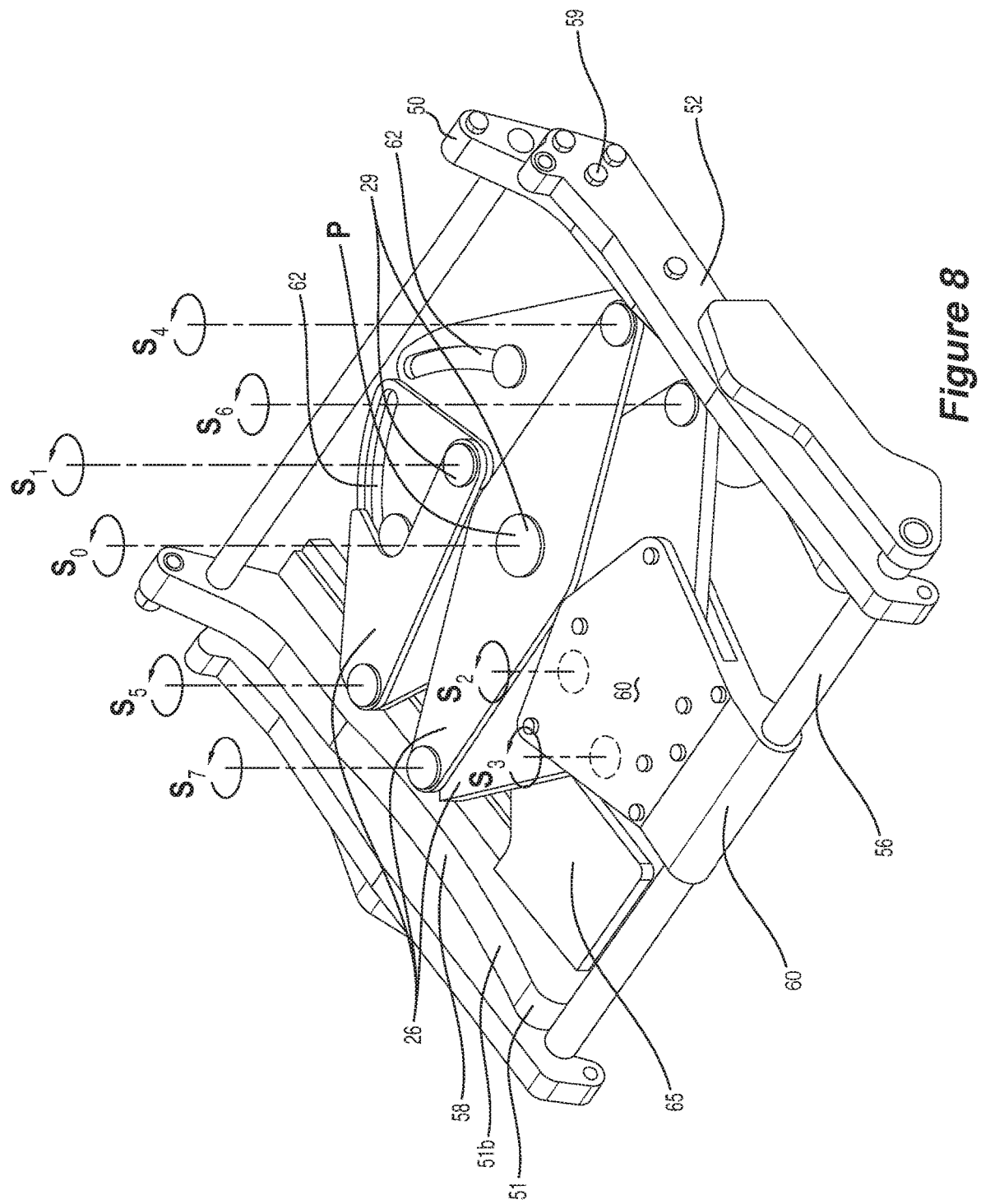
FIG. 8 is a perspective top view of a scissor mechanism for driving the seat between upright and flat configurations, illustrated within the carriage mechanism of FIG. 6.

A top surface 51*b* of the frame rails 51 provides a cam surface 58 (see FIG. 8). A cam follower 59 is provided on the seat-pan frame 52. The seat-pan frame 52 is located on the seat frame 50 such that the cam follower 59 is supported on the cam surface 58. As the actuator mechanism 2 moves the seat-pan frame 52 relative to the seat frame 50, the cam follower 59 is driven simultaneously backwards/forwards and upwards/downwards along the cam surface 58 thereby varying the distance between the rear portion 6 of the seat pan 5 from the seat base 15. This motion also results in a change in the inclination of the seat pan 5 as illustrated in FIG. 3.

Figure 17B:
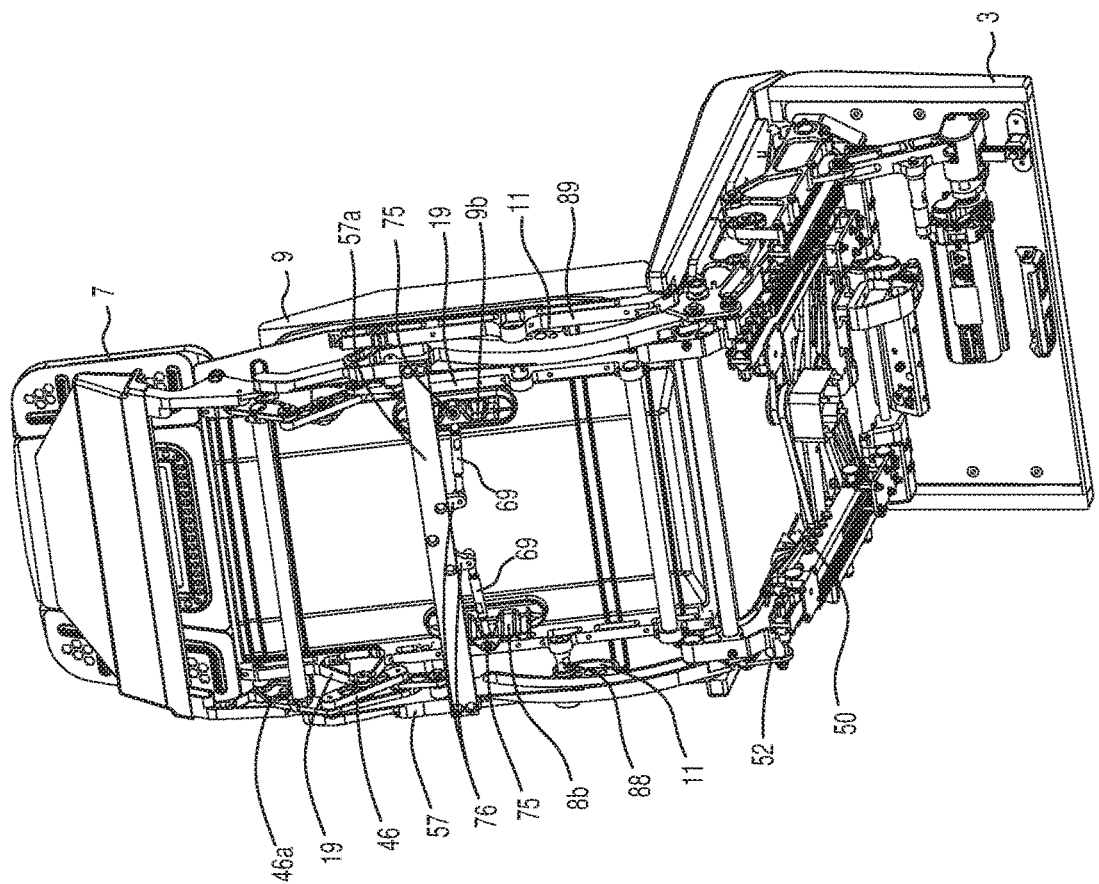
FIG. 17B is a perspective view of the seat back, illustrating a seat back frame, a primary arm and a series of linkages that cooperate between the seat back frame, the headrest and the side wings.

Further cam mechanisms (illustrated in FIG. 17B) can be employed to adjust the inclination of the seat-back frame 57 in response to a trajectory of the cam follower 59 along the cam surface 58.

Towards a forward end of the seat-pan frame rails 53 a rotation axis P1 defines the axis of rotation and engagement location for the lower leg support 3 to pivotally connect to the seat pan 5. Pivotal motion of the lower leg support 3 is effected by a motor 17, illustrated in FIGS. 14B and 17B.

As the carriage 20 is driven across the seat base 15 the seat support member 25 is extended between the seat-pan frame 52 and the seat frame 50 providing support for the seat 1. The seat support member 25 provides a lesser contribution to the stiffness of the seat 1 in the upright configuration (1A) as the components of the seat carriage 20 are closely packed in the upright configuration and the weight of the passenger is transferred directly through the seat 1 into the seat base 15, with minimal load offset.

Figure 7:
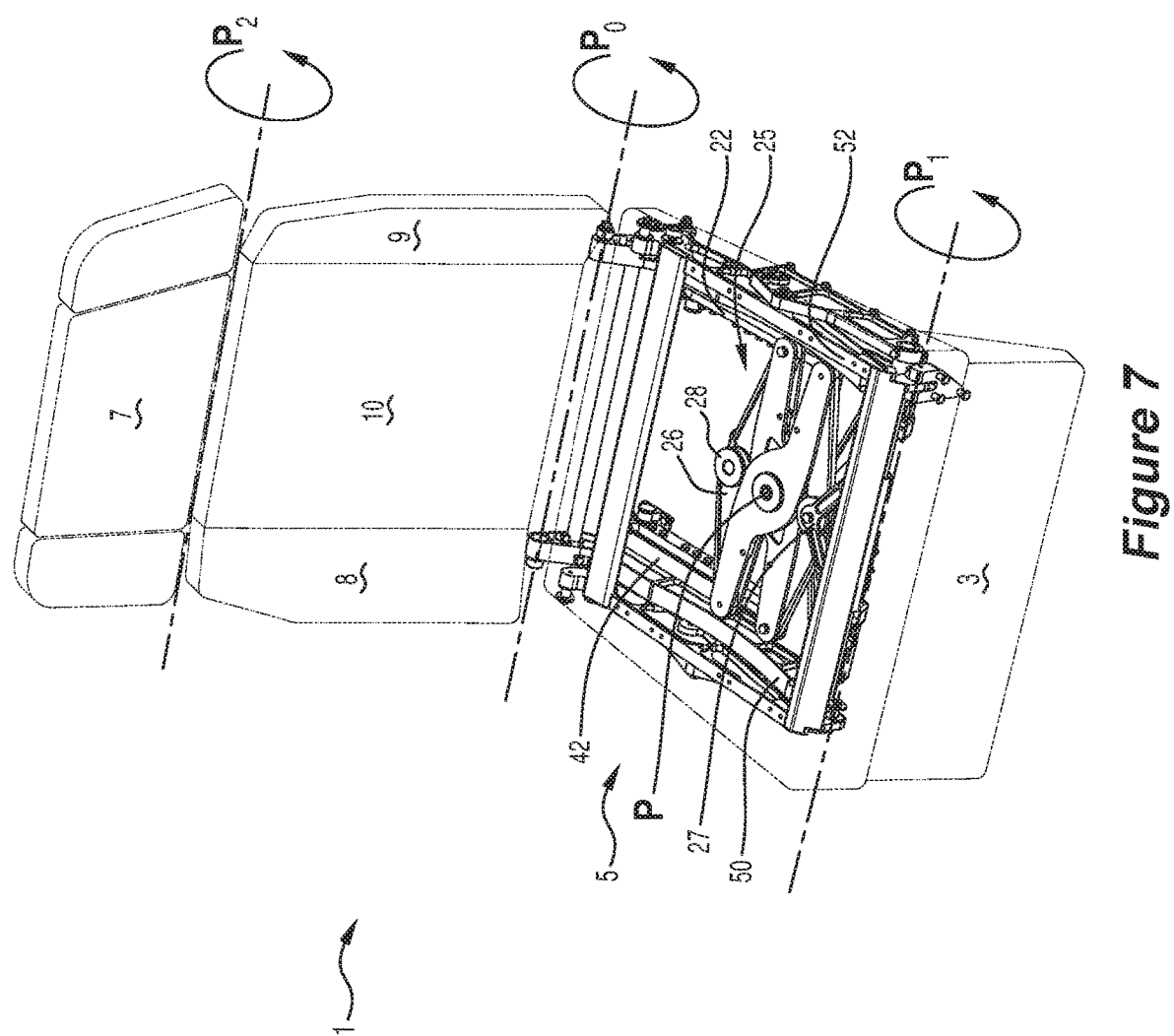
FIG. 7 is a perspective illustration of the seat carriage of FIG. 6 within a wireframe model of an aircraft seat.

FIG. 7 illustrates the carriage 20 in an upright configuration (1A), with a wireframe model of the seat 1 and seat support member 25 superimposed thereon for reference. The seat support member 25 is illustrated as a scissor mechanism 26, sometimes referred to as a "pantograph" mechanism.

It is contemplated that the seat support member 25 can be configured as one or more telescoping beams or a folding arm arrangement, engaged between the seat base 15 and the seat carriage 20 to be extended between therebetween as the motor 73 drives the seat carriage 20 forward. However, there are design trade-offs to be made in relation to: (i) material strength, (ii) beam diameter and packaging space, (iii) cost of manufacture and (iv) weight, each of these factors influencing any commercial solution to increasing support to the seat.

Between the head rest 7 and the seat back 10 a third rotation axis P2 is located. The axis P2 is the rotational axis about which the head rest 7 pivots relative to the seat back 10. Rotational movement of the head rest 7 relative to the seat back 10 can be initiated by an independent motor or by virtue of an interrelated linkage system (Illustrated in FIG. 17C).

Seat Support Member

The seat support member 25 comprises a scissor mechanism 26 including a primary pair of arms 30 coupled together for pivoting movement about an axis S0 extending perpendicular to a plane of each of the primary pair of arms 30 between an extended configuration in which the primary pair of arms 30 lie substantially on top of each other parallel to the first direction and a retracted configuration in which the primary pair of arms 30 lie substantially on top of each other perpendicular to the first direction; and wherein in use the first ends of each of the primary pair of arms 30 are coupled with a seat base 15 and the second ends of each of the primary pair of arms 30 are coupled with a moveable seat carriage 20, such that movement of the moveable seat carriage 20 away from the seat base 15 causes movement of the scissor mechanism 26 towards the extended configuration.

Figure 7A:
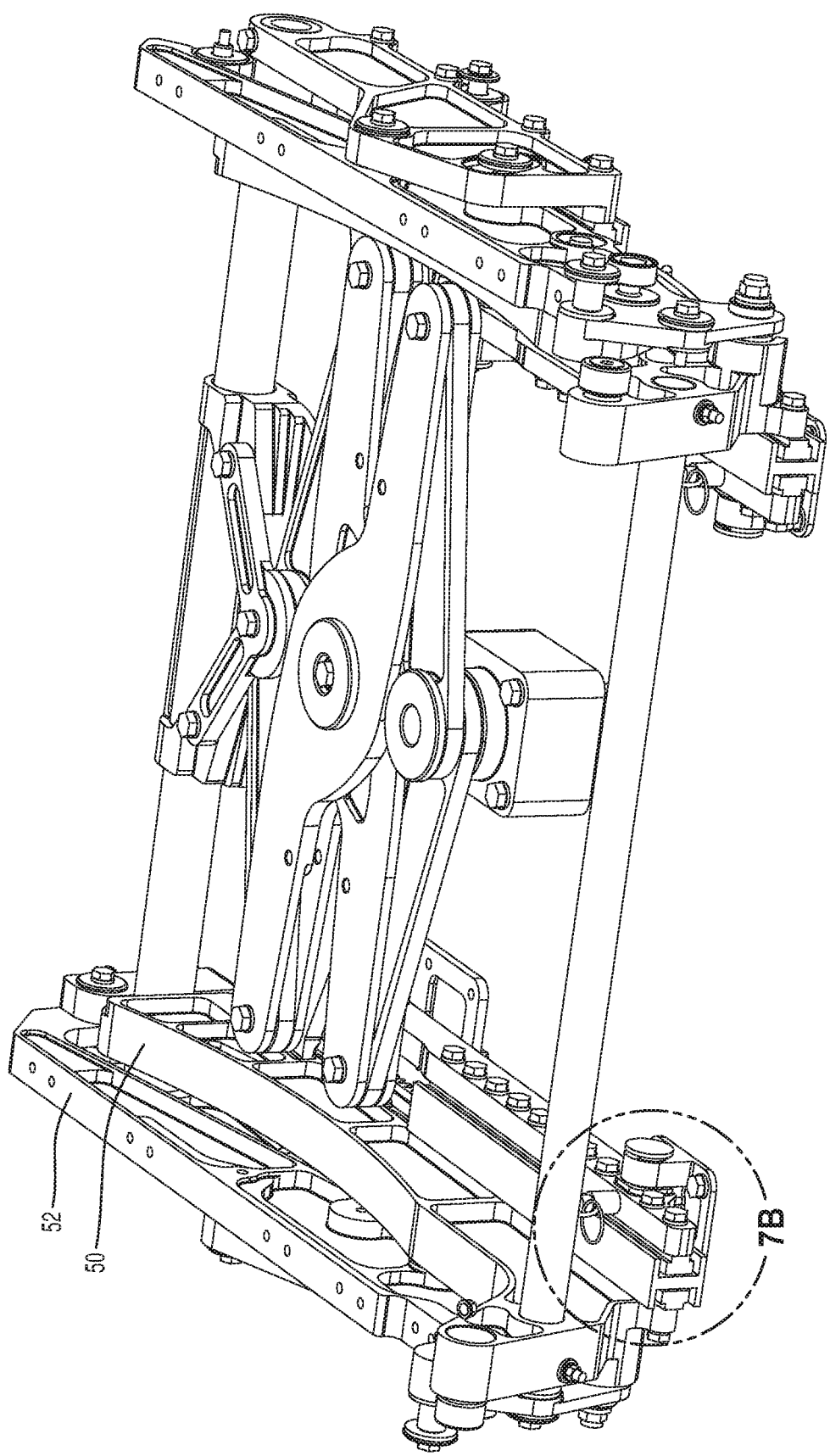
FIG. 7A is a perspective illustration of the seat carriage of FIG. 6 illustrating seat mounting rails in a fully retracted configuration.
Figure 7B:
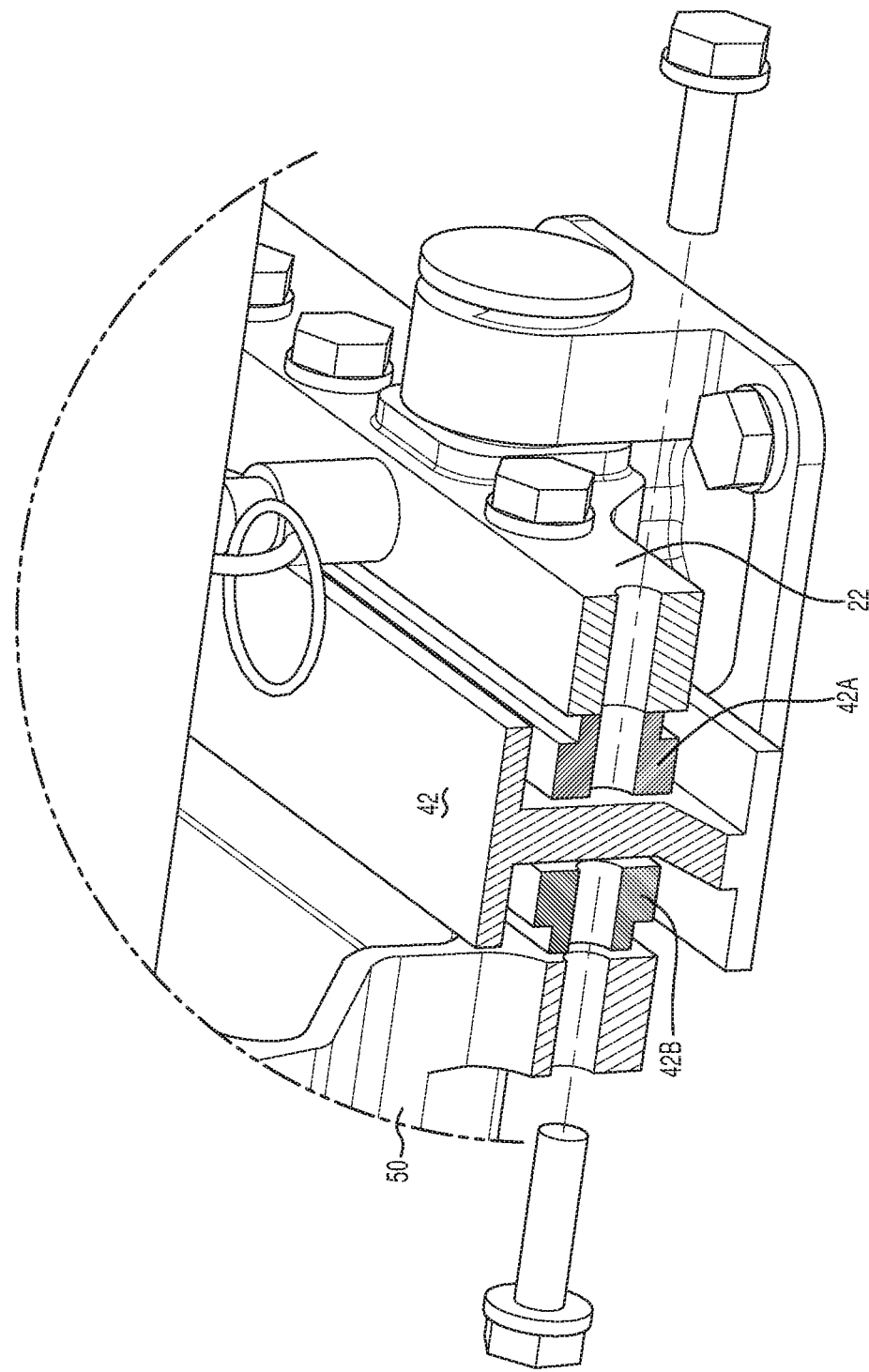
FIG. 7B is an enlarged view of the encircled portion of FIG. 7A illustrating the telescoping arrangement of inner and outer support rails adjacent the seat mounting rails, within the seat carriage.

The actuator mechanism 2 comprises a pair of support rail mounts 42, a pair of inner support rails 42*a*, a pair of outer support rails 42*b* (illustrated in FIGS. 7, 7A and 7B), a front mounting plate 60 and rear mounting plate 61, and the motor 73. The seat support member 25 in FIG. 7 is in a retracted configuration and as the seat 1 transitions towards the flat configuration (1C), or bed mode, the seat support member 25 is drawn towards the fully extended configuration.

A rearward end 28 of the scissor mechanism 26 is coupled with the seat base 15 and a forward end 27 of the scissor mechanism 26 is coupled with the seat carriage 20.

As the seat carriage 20 is driven further away from the seat base 15, the inner support rails 42*a* and the outer support rails 42*b* telescopically extend from the support rail mounts 42. This provides additional travel to the seat carriage 20 to allow the necessary movement to recline the seat 1 to a substantially flat configuration within the pod 100, whilst maintaining connection to the seat base 15. The rails 42*a*, 42*b* are illustrated in detail in FIGS. 7A and 7B.

The rearward end 28 of the scissor mechanism 26 is permanently attached to the seat base 15, such that portions of the scissor mechanism can rotate relative to the seat base 15 to allow the scissor mechanism 26 to extend and retract. The rearward end 28 of the scissor mechanism 26 cannot translate relative to the seat base 15.

More particularly, the forward end 27 of the scissor mechanism 26 is permanently attached to the seat-pan frame 52, such that portions of the scissor mechanism 26 can rotate relative to the seat-pan frame 52 to allow the scissor mechanism to extend and retract. The forward end 27 of the scissor mechanism 26 translates relative to the seat base 15, while remaining coupled with the seat-pan frame 52.

Scissor Mechanism

The forward end 27 of the scissor mechanism 26 moves with the seat carriage 20 in a first direction away from the seat base 15. The scissor mechanism 26 includes a primary pair of arms 30 pivotally coupled to one another about an axis (S0), the axis bisecting each of the primary pair of arms 30 between a first end and a second end of each arm, wherein the axis S0 extends perpendicularly to an aircraft of each of the primary pair of arms 30 allowing the arms 31, 32 to rotate between an extended configuration in which the primary pair of arms 30 lie substantially on top of each other parallel to the first direction and a retracted configuration in which the primary pair of arms 30 lie substantially on top of each other perpendicular to the first direction. The first ends of each of the primary pair of arms 30 are coupled with the seat base 15 and the second ends of each of the primary pair of arms 30 are coupled with the seat carriage 20, such that activating the motor 73 to drive the seat carriage 20 draws the scissor mechanism 26 towards the extended configuration as the seat carriage 20 moves away from the seat base 15 and the seat 1 transitions towards the flat configuration.

The first direction is a forward direction, where the seat pan frame 52 is driven forward along the seat frame 50. The motor 73 can be reversibly operated to draw the seat carriage 20 towards the seat base 15 and restore the seat support member 25 to its retracted configuration by reversing the operation of the motor 73 and the seat pan frame 52 is driven in a second direction, opposite to the first direction. The second direction is rearwards, where the seat pan frame 52 is retracted towards the seat frame 50.

An alternative embodiment of the scissor mechanism 26 is illustrated in further detail in FIG. 8, showing a top perspective view of the scissor mechanism 26 in a fully retracted configuration.

The forward end 27 of the scissor mechanism 26 is connected to the seat-pan frame 52 via a seat-pan cross-beam 56. The cross-beam 56 extends between the pair of seat-pan frame rails 53. The cross-beam 56 lies substantially parallel to the rotational axis P1 about which the lower leg support 3 rotates.

Centrally mounted along the cross-beam 56 is a bifurcated mount plate 60 having a central recess for pivotally receiving a forward portion of the scissor mechanism 26. The mounting plate 60 retains the scissor mechanism 26 in engagement with the seat-pan frame 52 while allowing free rotation of the scissor mechanism 26 to extend and retract.

The scissor mechanism 26 is illustrated in FIG. 8 to comprise three pairs of pivoting arms, a first pair 30, second pair 34 and third pair 38.

The primary pair of arms 30 includes a first arm 31 and a second arm 32. The two arms 31, 32 pivotally constrained to each other about a pin P. Pin P provides a rotational axis S0 about which the arms 31, 32 pivot. The axis S0 runs perpendicular to a horizontal plane in which the each of the first pair 30, the second pair 34 and the third pair 38 of arms lie. The axis S0 allows the first arm 31 and second arm 32 to rotate in the horizontal plane between a retracted configuration where the two arms 31, 32 substantially overlap each other traversing the seat frame rails 51; and an extended configuration where the two arms 31, 32 only overlap each other in the region of the axis S0, extending to form a pseudo-backbone along the length of the extended seat 1 in the flat configuration (1C) as illustrated in FIG. 14. A mounting plate 70 is ideally located on axis S0 to mount and support the first pair of arms (illustrated in FIG. 11).

The rotation axis S0 extends perpendicularly to the seat pan 5 (extending upwardly out of the seat pan 5). The rotational axis S0 is illustrated to lie half way between the ends of the first and second arms 31, 32. However, it is possible to move the axis S0 along the length of the arms 31, 32 to vary the extension and retraction movement of the scissor mechanism 26.

The arms 31, 32 are elongate to provide sufficient extension between the retracted and extended configurations for the desired range of seat motion. Additional pairs of arms can be added into the scissor mechanism 26 to provide further reach; however, each additional pair of arms will increase the moment load on the scissor mechanism 26. Additional reach increases the offset distance in loading between the seat pan 5 and the seat base 15. Additional loading will require additional weight or material strength to support the seat 1 without incurring loss of stability. Each of the aforementioned factors is taken into consideration, to optimise the design and loading criterion for the seat 1.

The first arm 31 and second arm 32 of the primary arms 30 are planar. This enables the pair or arms to rotate in close proximity to one another while occupying a minimum height. As noted herein, the available space on an aircraft is hotly contested and any reduction in packaging space will be advantageous.

The overall form of arms 31, 32 in top view and bottom view is propeller-shaped, having two equally sized and opposing blades. Arms 31 and 32 are identical to one another. Arm 31 provides a thickened centre section 29 around the primary rotational axis S0. The thickened section 29 helps to distribute stress about the axis S0 and further provides a greater overlap between the two arms through which to transfer load.

Distal ends 31a, 31b of arms 31 extend outwardly from the thickened centre section 29 such that the overall length across arm 31 is only marginally less that the distance between the two rails 51 of the seat frame 50. At each of the distal ends 31a, 31b of arm 31 is an aperture 37 for receiving a connector 37a to facilitate a rotational engagement with an adjacent arm of a subsequent pair of arms of the scissor mechanism 26.

The primary arms 30, secondary arms 34 and tertiary arms 38 are all oriented to rotatably operate in a single operative plane. The operative plane is a horizontal seat plane that extends across the seat pan 5 parallel to the first direction of movement. Specifically, the scissor mechanism 26 extends and retracts in-plane with the translational plane of the rack and pinion mechanism 54, 71 that drives the carriage 20 across the seat base 15.

The secondary pair of arms 34 comprises a first arm 35 and a second arm 36 which are pivotally coupled to one another. A pivot axis 51, parallel to axis S0 is located towards a first end of each of the arms 35, 36 to form a V-shaped arrangement. The unattached ends of arms 35 and 36 are rotatably coupled to a free end of each of the primary arms 31 and 32, respectively creating pivot axes S4 and S5.

The tertiary pair of arms 38 comprises a first arm 39 and a second arm 40 which are pivotally coupled to one another. Pivot axes S2 and S3 lie parallel to axes S0, S1 and are located towards a first end of each of the arms 39, 40 to form a substantially V-shaped arrangement. The unattached ends of arms 39 and 40 are rotatably coupled to the remaining free ends of each of the primary arms 31 and 32, respectively creating pivot axes S6 and S7.

The scissor mechanism 26 thus comprises all three pairs of arms 30, 34, 38 rotatably interconnected to form a pantograph-style mechanism that opens and closes, to provide an extendable/retractable seat support member 25 for the seat 1.

The pantograph-style scissor mechanism 26 can deliver a large movement of the seat 1 within a compact package. This is advantageous as it means less space is used by the mechanism 26, and more space can be given to the passenger, be it in personal space, or in amenities. In the tightly contested world of aircraft seating this is a significant advantage.

The rear end 28 (arms 35, 36) of the scissor mechanism 26 is pivotally mounted to a rear mounting plate 61 (illustrated in FIG. 11). The rear mount plate 61 is mounted to the seat base 15, and provides two mounts for engaging with two arcuate mounting slots 62 in each of the arms 35 and 36 of the secondary pair of arms 34 of the scissor mechanism 26. This allows each of arms 35 and 36 to rotatably engage with the rear mount plate 61.

Figure 12B:
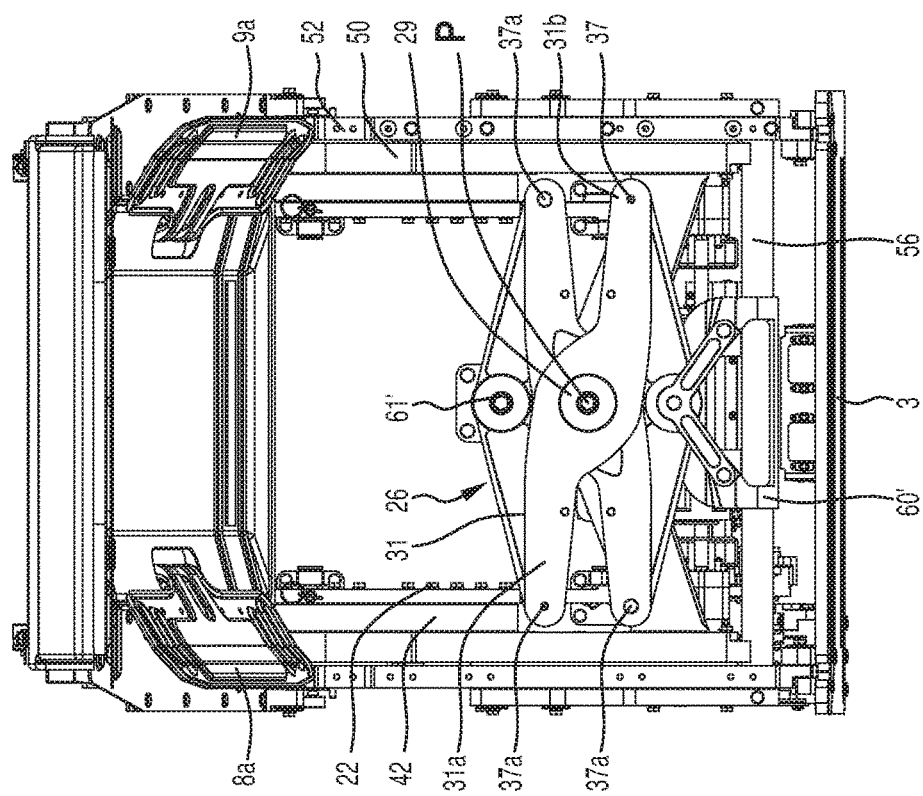
FIG. 12B is a top view of the scissor mechanism and seat pan frame in the fully upright seat configuration, illustrating a lower leg support of the seat.

In an alternative embodiment of the scissor mechanism 26 (as illustrated in FIG. 12B), the secondary pair of arms 34 is mounted to a spigot 61'. Like rear mount plate 61, the spigot 61' is also fixedly mounted to the seat base 15 (or other non-moving component of the seat 1 or upper base frame 16) however the arms 35, 36 are pivotally mounted to the spigot 61' and are free to rotate thereabout. This arrangement of spigot 61' removes the need for the arcuate mounting slots 62 (illustrated in FIG. 11).

Each of the rotational connections between the arms of the scissor mechanism can be formed using pins, spigots or similar forms of rotational joint. Each of these rotational joints on axes S0, S1, S2, S3, S4, S5, S6, and S7 can further comprise bearings to increase the longevity of the mechanism and also to provide smooth, friction free rotation of the arms of the mechanism 26.

Figure 10:
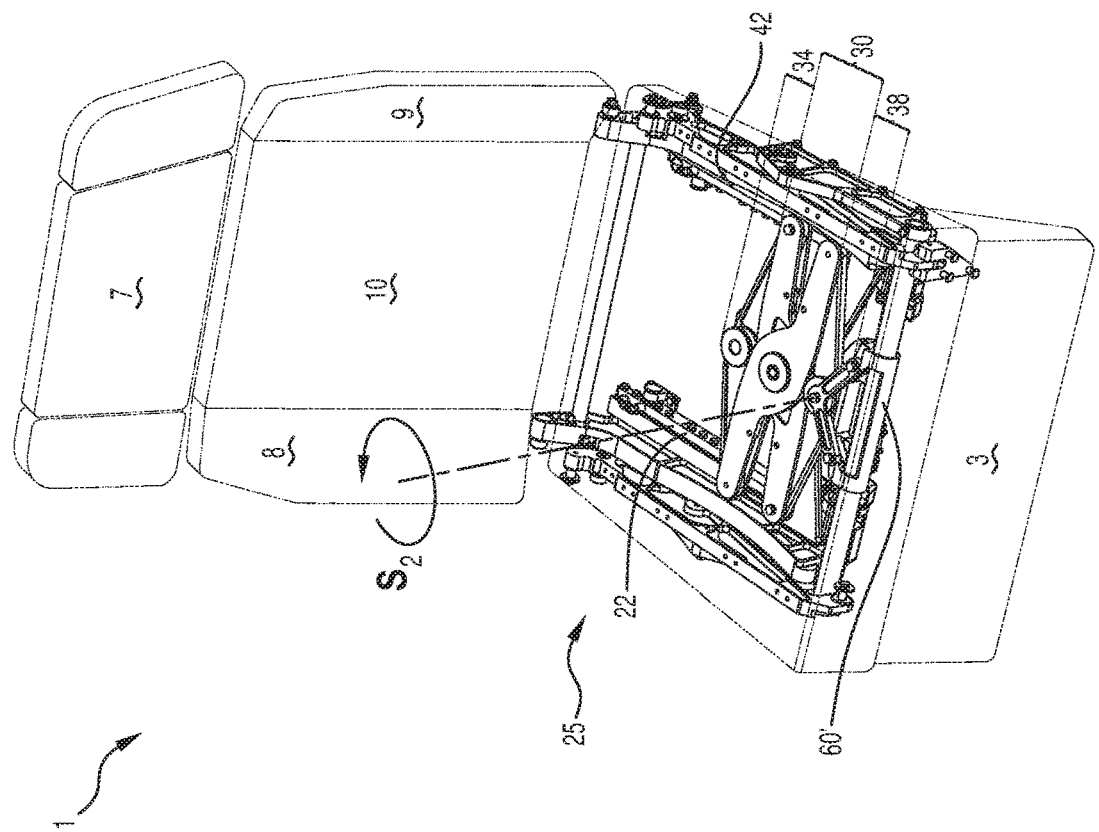
FIG. 10 is a perspective illustration of the scissor mechanism of FIG. 8 within a wireframe model of an aircraft seat and carriage.
Figure 9:
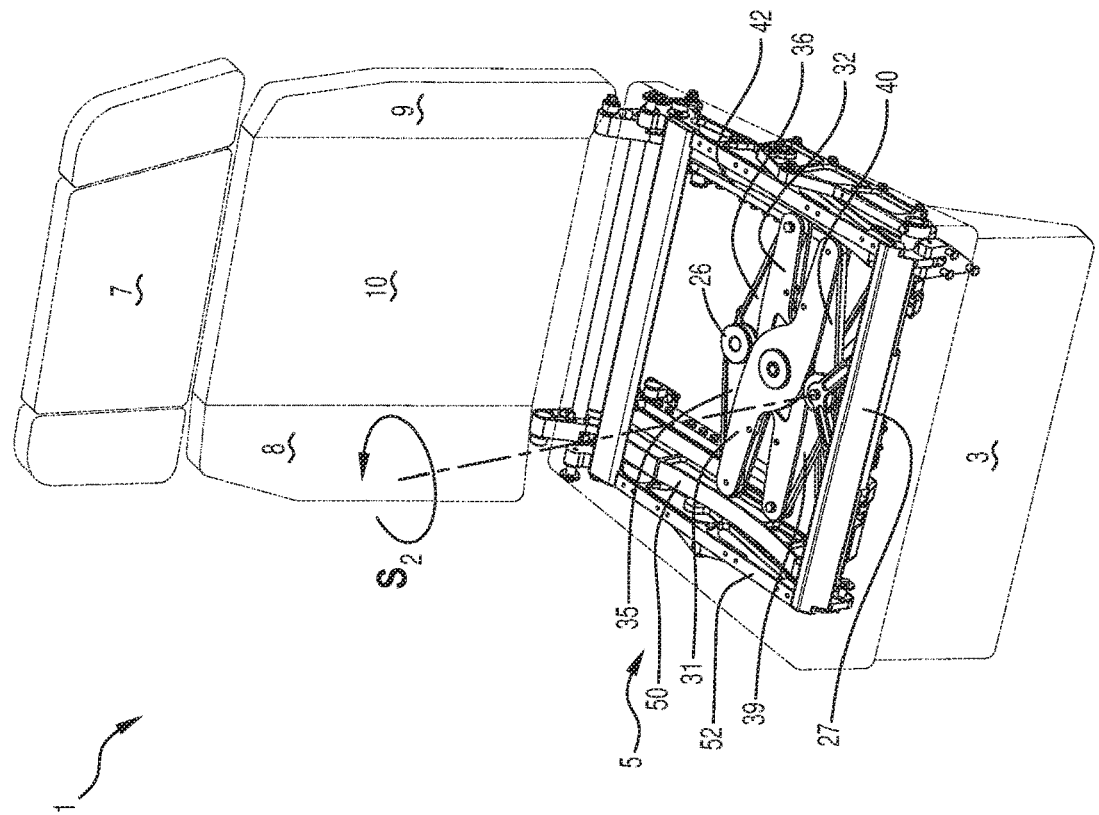
FIG. 9 is a perspective view of the scissor mechanism for seat extension illustrated within the carriage mechanism of FIG. 6 superimposed upon a wireframe model of an aircraft seat.

FIG. 9 illustrates the carriage 20 and seat support member 25 super-imposed upon a wireframe model of seat 1 to better illustrate the location of these parts with the overall seat 1. FIG. 10 illustrates an alternative front mounting plate 60' for mounting the forward end 27 of the scissor mechanism 26 to the seat-pan cross-beam 56. Mounting plate 60' provides a single rotational axis S2', about which the tertiary pair of arms 38 can rotate.

FIG. 11 illustrates the carriage 20 and seat support member 25 of FIG. 8 when viewed from below the seat 1. A cover plate 63 is disposed below the scissor mechanism 26 to cover the opening and closing pairs of arms 30, 34, 38. This provides protection from dust and dirt and other foreign objects being drawn into the scissor mechanism 26. Accordingly, the cover plate 63 reduces the risk of damage or malfunction of the scissor mechanism 26 during a flight. The cover plate 63 can also be used as a mounting member for the primary pair of arms 30 and mounting plate 70.

FIG. 11 further illustrates a pair of toothed racks 54 disposed along the undersides of each of the rails 51 of the seat frame 50. The racks 54 are translatably moved by the rotation of a pair of pinion gears 71, wherein the teeth 72 of each pinion gear 71 are meshingly coupled with each of the respective racks 54. Each of the pair of pinion gears 71 are mounted at opposing ends of a shaft 64. The shaft 64 is driven by motor 73. The motor 73 can be an electric motor. The motor 73 is placed approximately centrally across a width of the seat pan 5, but can be placed anywhere under the seat 1 provided the shaft 64 is driven.

The shaft 64 can be mounted to the seat base 15 separately or, as illustrated in FIG. 11 where the two front rail mount brackets 21 at the front of the seat mount rails 22 are modified to rotatably receive the ends of shaft 64.

Upright Mode

With the seat 1 in upright configuration (1A), the seat back 10 provides a pair of deployed wings 8, 9. The wings 8, 9 in a deployed configuration, are angled forward of the seat back 10. This places the seat back 10 in a curved configuration to receive and support a passenger's upper body. As the seat 1 reclines the wings 8, 9 remain deployed to continue to provide support to the passenger.

Figure 12A:
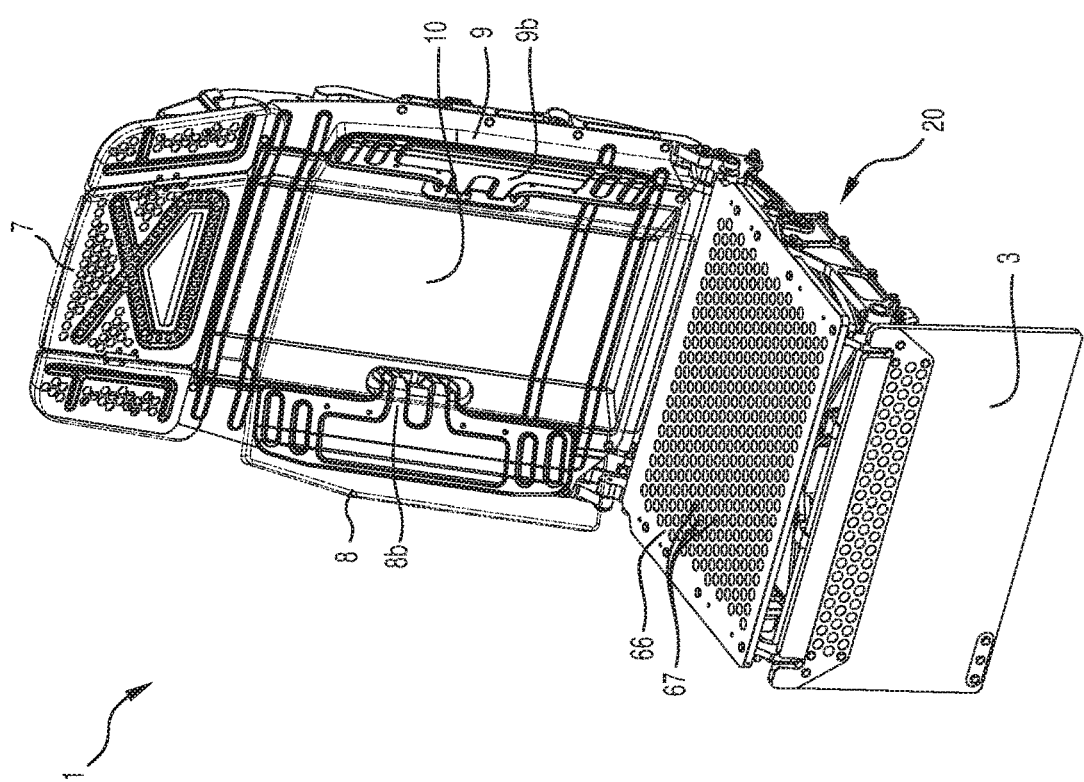
FIG. 12A is a perspective view of a seat pan, seat back, headrest and lower leg support assembly of an aircraft seat in a fully upright configuration, illustrating elevated opposing side-wing frames of the seat back.

The deployed configuration of the wings 8, 9 is illustrated in FIG. 12A. Each of the wings 8, 9 has a T-shaped plate for supporting separate wing cushions or portions of the seat back cushion thereon (illustrated as a wire frame overlay on FIG. 12A).

The T-shaped plate supports the cushion along the T-bar of the plate, disposed in a longitudinal orientation to extend substantially along the length of the seat back 10. This T-bar constitutes a front portion of the wings 8, 9.

The central bar of the T-shaped plate is curved and extends through the seat 1 to form a rear portion 8b, 9b of each of the wings 8, 9 (illustrated in FIG. 12A). Each rear portion 8b, 9b is pivotally mounted to a wing deployment mechanism 68 that extends along the seat-back 10 and is located approximately half way between pivot axes P0 and P2. The wing deployment mechanism 68 operates in response to cooperative movement of the seat back frame 57 and seat pan frame 52.

Each T-shaped plate is additionally swaged to provide stiffening of the plate and to further facilitate material gauge reductions to save mass.

FIG. 12A further illustrates a seat pan cushion support plate 66. The plate 66 is made from steel or aluminium or other metal or plastic having sufficient strength to support the loads on the seat pan 5 in use.

The plate 66 is further provided with openings 67 to further reduce the weight of plate 66. These openings 67 can be in various forms, and can be flanged openings formed as dimples to not only reduce weight but to improve stiffness of the plate 66.

The seat cushion (not illustrated) can be mounted directly or indirectly to the seat pan cushion support plate 66.

Figure 12C:
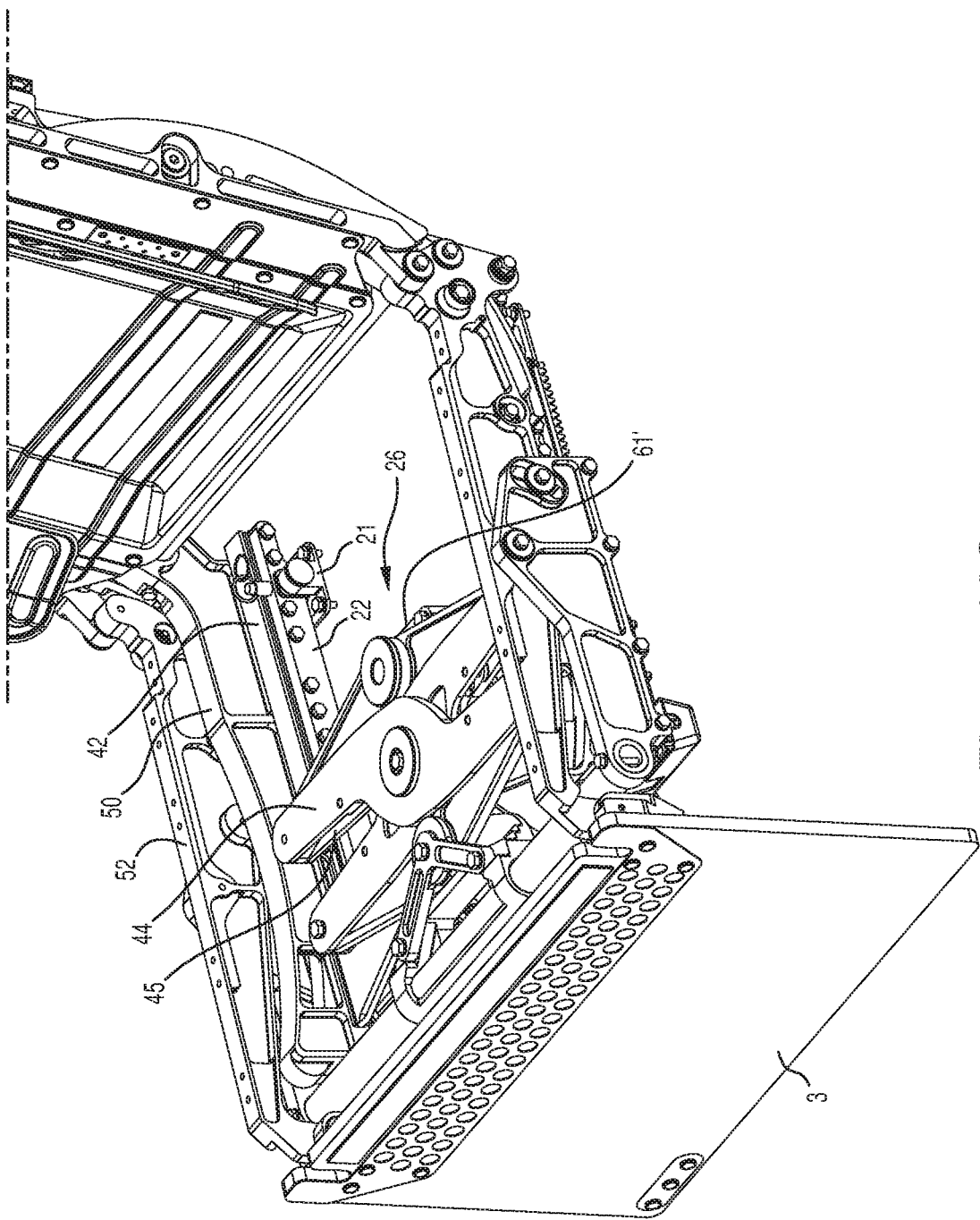
FIG. 12C is a perspective view of the scissor mechanism and lower leg support of the seat in the fully upright configuration.

FIGS. 12B and 12C illustrate an enlarged view of the scissor mechanism 26 in a top and perspective view, respectively. FIG. 12C illustrates further details of the pairs of arms 30, 34, 38 and their layered construction.

Each of the primary arms 31 and 32 are formed from bifurcated plates. As such, each arm 31, 32 provides a top plate 44 and a bottom plate 45 configured to have a central gap therebetween for receiving a portion of another arm 31, 32; 35, 36; 39, 40. By interleaving the top 44 and bottom plates 45 of interconnected arms the overall thickness of the scissor mechanism 26 can be minimised. Furthermore, the overlapping surfaces of the top 44 and bottom plates 45 of each pair of interconnected arms provides additional overlapping surfaces to transfer loads therebetween in use.

Recline Mode

The seat is driven into the reclined configuration by the motor 73. The motor 73 is initiated by a switch or toggle (not illustrated) accessible to the passenger to activate the transformation of the seat 1 on passenger demand.

The motor 73 can be an electric motor. This enables the seat pan frame 52 and seat back 10 to be driven into a fully reclined configuration using a single motor 73. The scissor mechanism 26 further occupies a small volume of space when compared to alternative support members. The scissor mechanism 26 is particularly compact in height as the three pairs of arms 30, 34 38 are all elongate and flat.

Figure 13B:
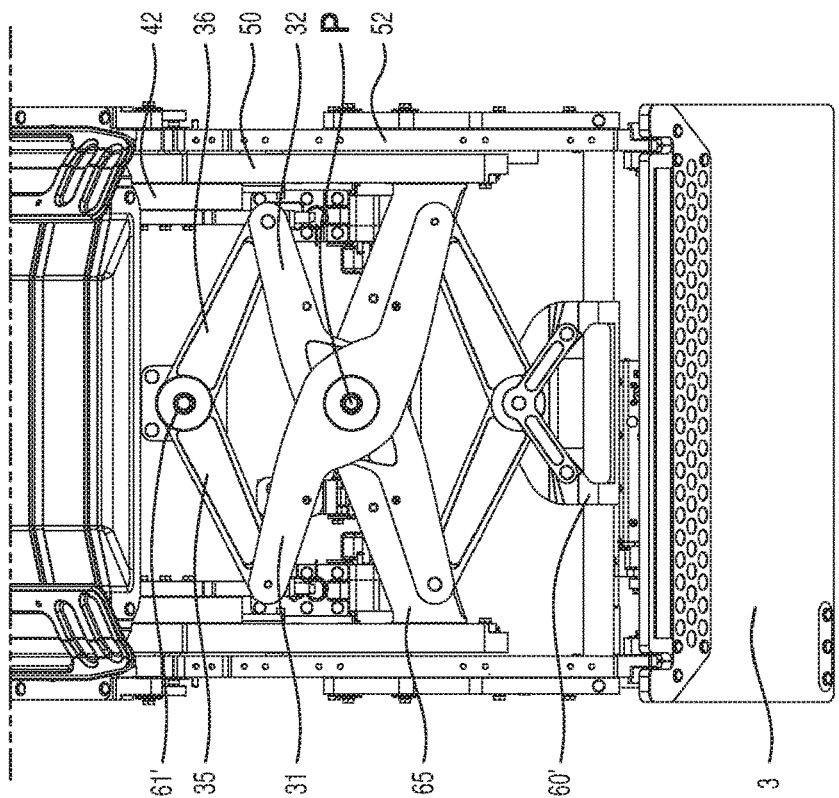
FIG. 13B is a top view of the scissor mechanism and seat pan frame in the reclined seat configuration, illustrating a lower leg support of the seat.
Figure 13A:
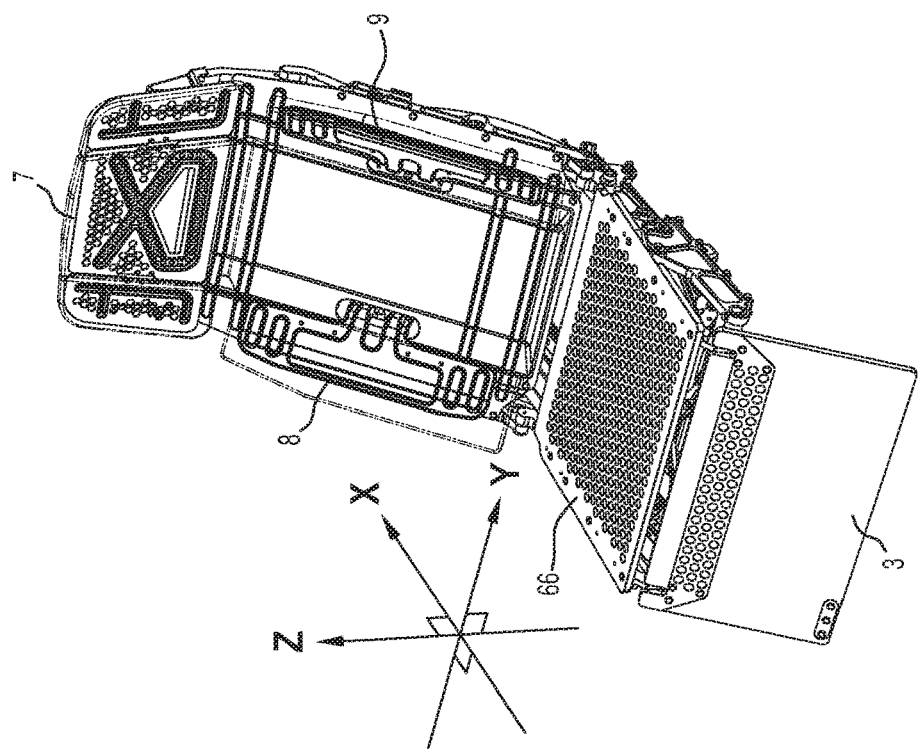
FIG. 13A is a perspective view of a seat pan, seat back, headrest and lower leg support assembly of an aircraft seat in a reclined configuration, illustrating elevated opposing side-wing frames of the seat back

FIG. 13A illustrates the wings 8, 9 still deployed as the remainder of the seat 1 has transitioned into the reclining configuration (1B).

Figure 13C:
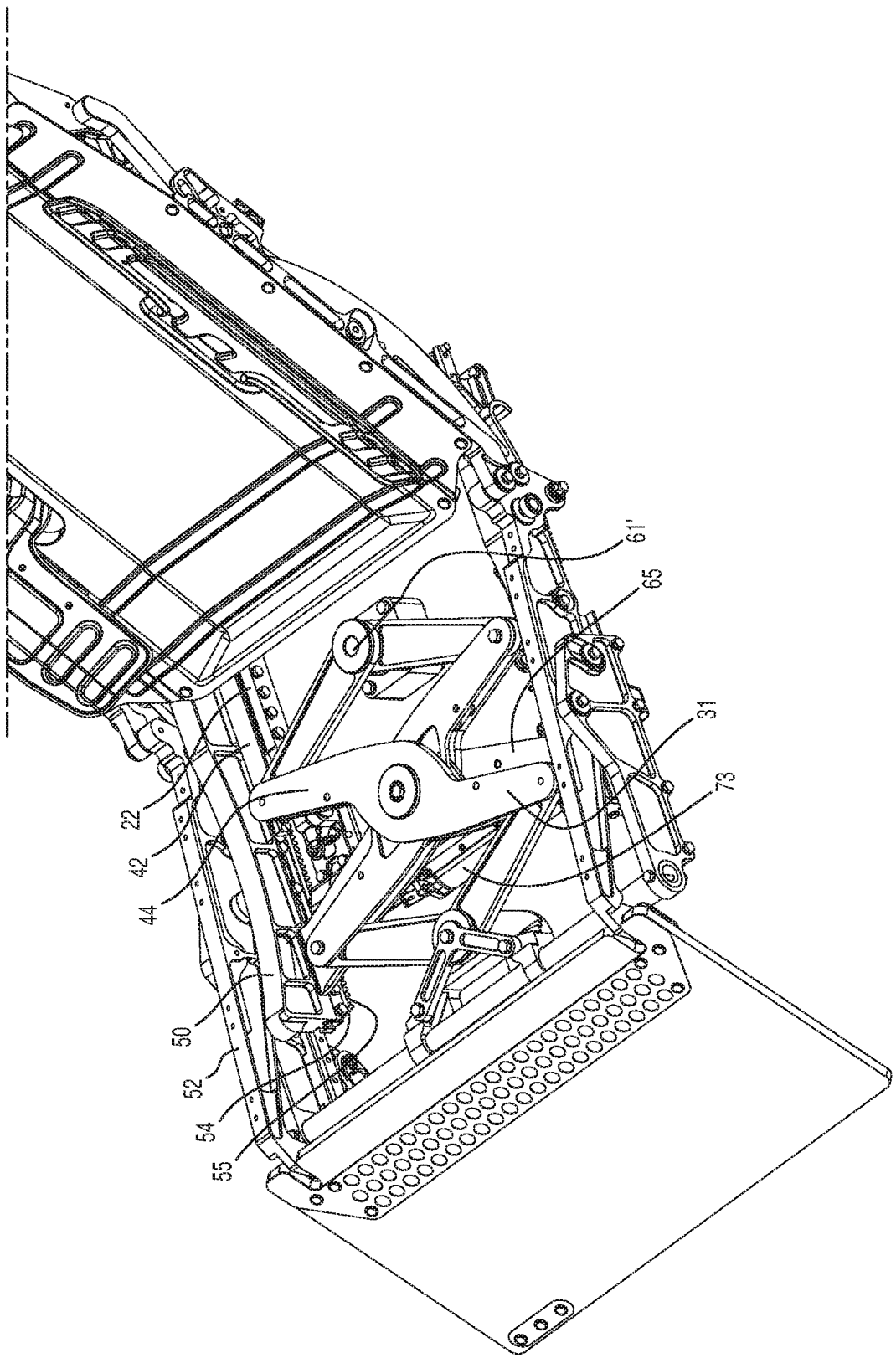
FIG. 13C is a perspective view of the scissor mechanism and lower leg support of the seat in the reclined configuration.

FIGS. 13B and 13C illustrate the carriage 20 and seat pan 5 of the seat in reclined configuration in each of a top and perspective view, respectively.

The spigot 61' illustrated in FIG. 13B is in the same location as shown in FIGS. 12B and 14B in relation to the seat base 15. All other components of the seat of FIG. 13B have moved forwards, away from the spigot 61', as the seat pan 5 travels forward.

With the scissor mechanism 26 drawn into an extended configuration the support cross-member 65 becomes visible underneath the scissor mechanism 26, as illustrated in FIGS. 13B and 13C. In this embodiment, the first pair of arms 30 is pivotally attached to the support cross-member 65, providing a stable and strong mounting for the arms 30. The cross-member 65 can be formed as a separate component in steel, aluminium, or suitably strong composite or plastic material. The cross-member 65 can also be integrally formed with the seat frame 50 strengthening the seat frame 50 and tying the rails 51 of the seat frame 50 together. The cross-member 65 supports the weight of the scissor mechanism 26.

The cross-member 65 is a chevron shape, and illustrated in FIG. 13B such that the central portion of the chevron extends rearwards, away from the lower leg support 3. The angle of the chevron, and also the orientation (forwards or backwards) can be adjusted to provide a desired amount of travel, and support for the seat 1.

As the scissor mechanism 26 extends, the inner support rail 42a translates along the support rail mount rail 42; the seat frame 50 is simultaneously translated along the outer support rail 42*b*; and further, the seat-pan frame 52 and seat back 10 are translated along the seat frame 50. FIG. 13C, when compared to FIG. 12C, illustrates the relative movement of these components as the seat transitions further from the upright configuration 1A towards the flat configuration 10.

Bed Mode

Illustrated in FIG. 14A the seat 1 has assumed a substantially flat configuration 10. The wings 8, 9 are stowed, that is, the wings 8, 9 are placed in flat contact with the substantially flat seat back surface 12. As illustrated in FIG. 14A, the seat back 10 has a seat back plate 13 for supporting a seat back cushion thereon (not illustrated). The back plate 13 provides a depression 14, to gently shape the seat back 10 for increased passenger comfort. This depression 14 and any surrounding form in the seat back plate 13 can be enhanced or minimised by the shape and stiffness of cushion (not illustrated) applied to the seat back 10.

FIG. 14B illustrated the scissor mechanism 26 at its full extension, with the seat 1 in the flat configuration 10. There is no longer any angular offset between the seat pan 5 and the seat back 10 and the entire seat 1 is in bed mode.

Further illustrated in FIG. 14B is a supplementary motor 17 for driving the motion of the lower leg support 3 relative to the seat pan 5. This motor 17 can be independently operated by a passenger. This motor 17 can be configured to be activated in conjunction with the motor 73 that drives the seat forward motion relative to the seat base 15 as the seat support member 25 is driven into a reclining configuration. The motor 73 operating the seat forward motion can be seen in FIG. 14B located under the seat back frame 57. As such, FIG. 14B exemplifies the extend of seat travel supported by the scissor mechanism 26, as the motor 73 is located under the front portion 4 of the seat pan 5 when the seat is in the upright configuration 1A.

The support cross-member 65 is almost entirely visible under the scissor mechanism 26 in the bed mode of FIG. 14B, as the two arms 31, 32 of the primary pair of arms 30 are substantially overlapping one another in a longitudinal orientation along the length of the flat seat 1.

Figure 15:
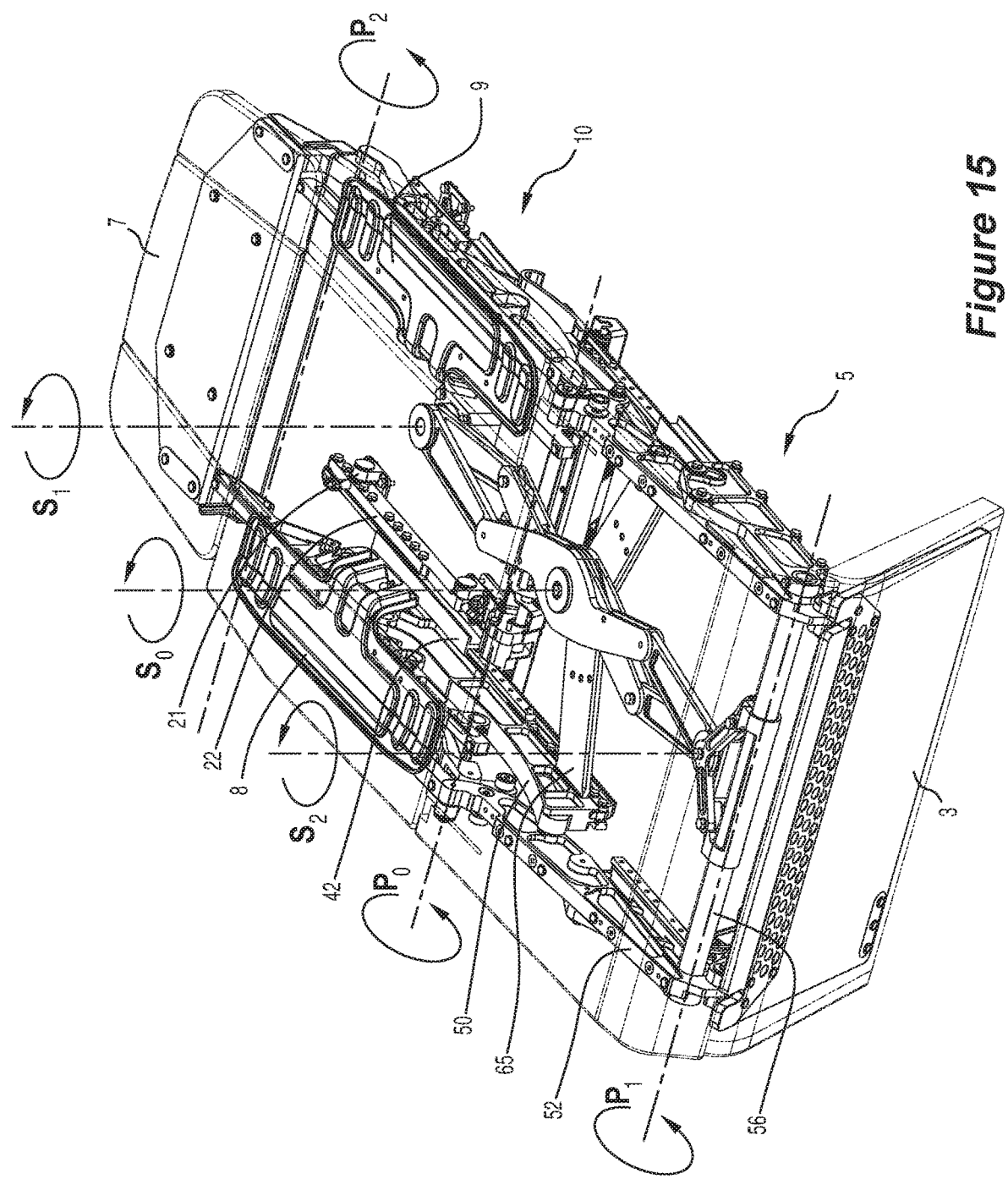
FIG. 15 is a top perspective view of the scissor mechanism fully extended across the carriage, superimposed upon a wireframe model of an aircraft seat.
Figure 16:
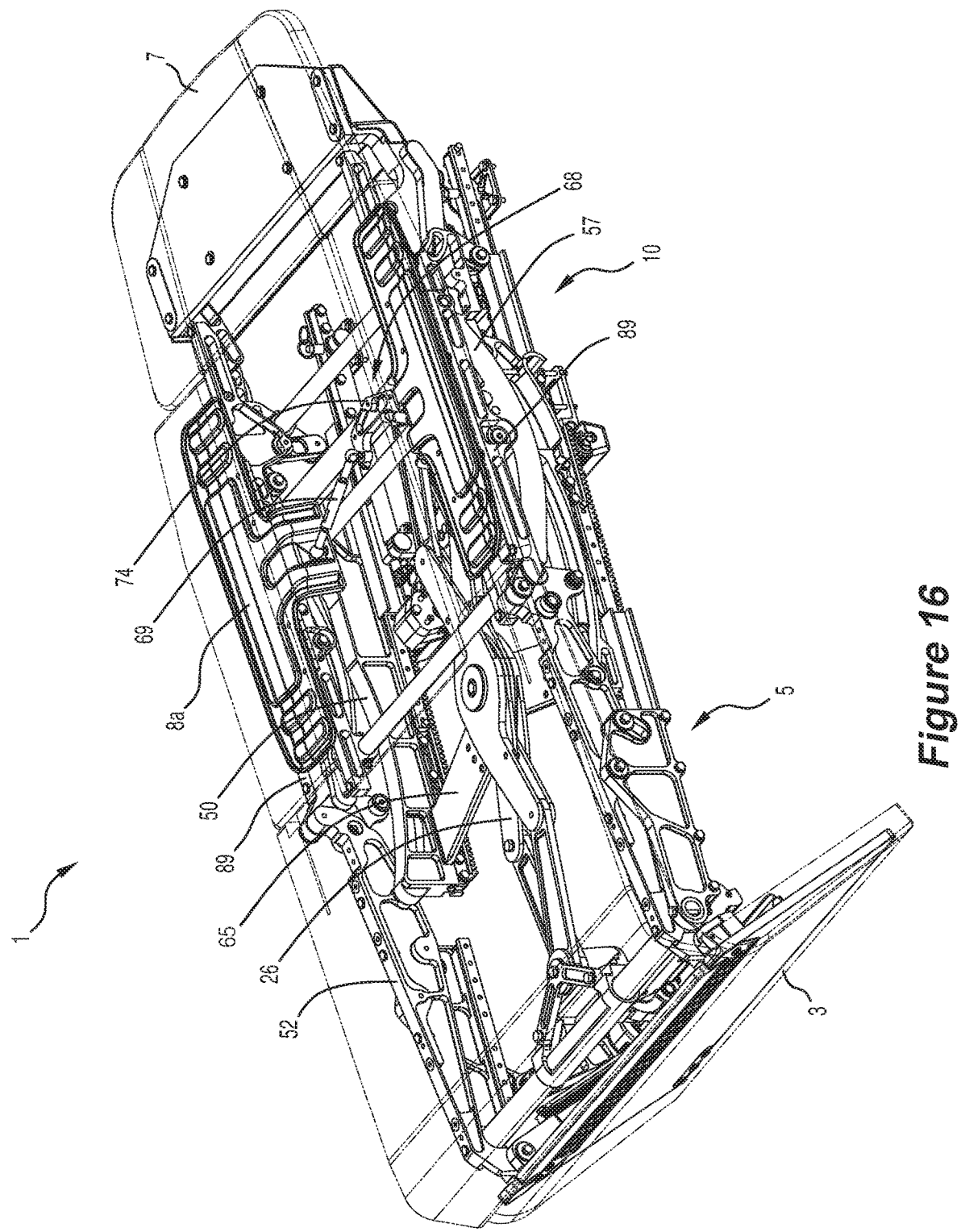
FIG. 16 is a top perspective view of the scissor mechanism and carriage in a full extended position including a seat back frame and head rest frame, illustrating a deployment mechanism for moving the opposing side-wings of the seat back.

FIGS. 15 and 16 illustrate the seat 1 is a flat "bed mode" configuration (1C), with various components removed or included in "wire frame" to illustrate the extended configuration of the scissor mechanism 26 under the cushions of the seat 1.

The front 27 of the scissor mechanism 26 is mounted to the moving seat-pan frame 52. The support cross-member 65 that extends between the rails 51 of the seat frame 50 supports the primary arms 30. The support cross-member 65 mounts the scissor mechanism 26 at the rotational axis S0 between the primary arms 30. This cross-member 65 is additional to the front mounting plate 60' and spigot 61' of the scissor mechanism 26. The cross-member 65 provides additional support to the seat frame 50 to better react the shifting weight of a passenger into the seat base 15. Essentially, the cross-member 65 provides an additional load path back into the seat frame 15.

FIG. 15 illustrates four phases of seat movement: first the support rail mounts 42 are translated along the seat mount rails 22 to achieve their full extent of forwards motion; secondly the inner and outer support rails 42*a*, 42*b* are drawn out of the support rail mounts 42 to their fullest extension; thirdly the seat frame 50 is extended away from the outer support rails 42*b* to their farthest extension; and finally, the seat pan frame 52 and attached seat back frame 57 are drawn across the seat frame 50.

The seat pan 5, seat back 10 and head rest 7 are in a substantially flat configuration in FIG. 15, although the lower leg support 3 is illustrated in a folded configuration. In practice, the lower leg support 3 can also be rotated about axis P1 to bring this portion of the seat into plane with the seat back 10, seat pan 5 and head rest 7.

An outer seat back frame 89 is illustrated in FIG. 16 connecting the seat back 10 motion to the motion of the seat pan 5, via the seat pan frame 52. This connection between the seat back 10 and the seat pan 5 ensures that the seat portions remain connected as the seat 1 transitions between the available configurations.

Located on an inner side of the outer seat back frame 89 is the seat back frame 57. The seat back frame 57 provides a curved track 11 to influence movement of the seat back 10 relative thereto. On an inner side of the seat back frame 57 is a pair of primary arms 19, one on either side of the seat 1. The primary arms 19 are connected to the outer seat back frame 89 by a track follower 88 which connects the outer seat back frame 89 and primary arms 19 together on each side of the seat back 10, through the seat back frame 57 (see FIGS. 17A and 17B).

Wing Mechanism

The full extent of available seat travel supported by the scissor mechanism 26 is evident in FIG. 16, which illustrates the full extension of the inner support rail 42*a* and outer support rail 42*b*, seat frame 50 and seat-pan frame 52 relative to the seat mount rails 22. Further illustrated in FIG. 16 (and FIG. 14C) is a wing deployment mechanism 68 mounted to the seat back frame 57 by bracket 74. The wings 8, 9 are pivotally connected to the seat-back frame 57 and driven via the wing deployment mechanism 68.

Figure 18:
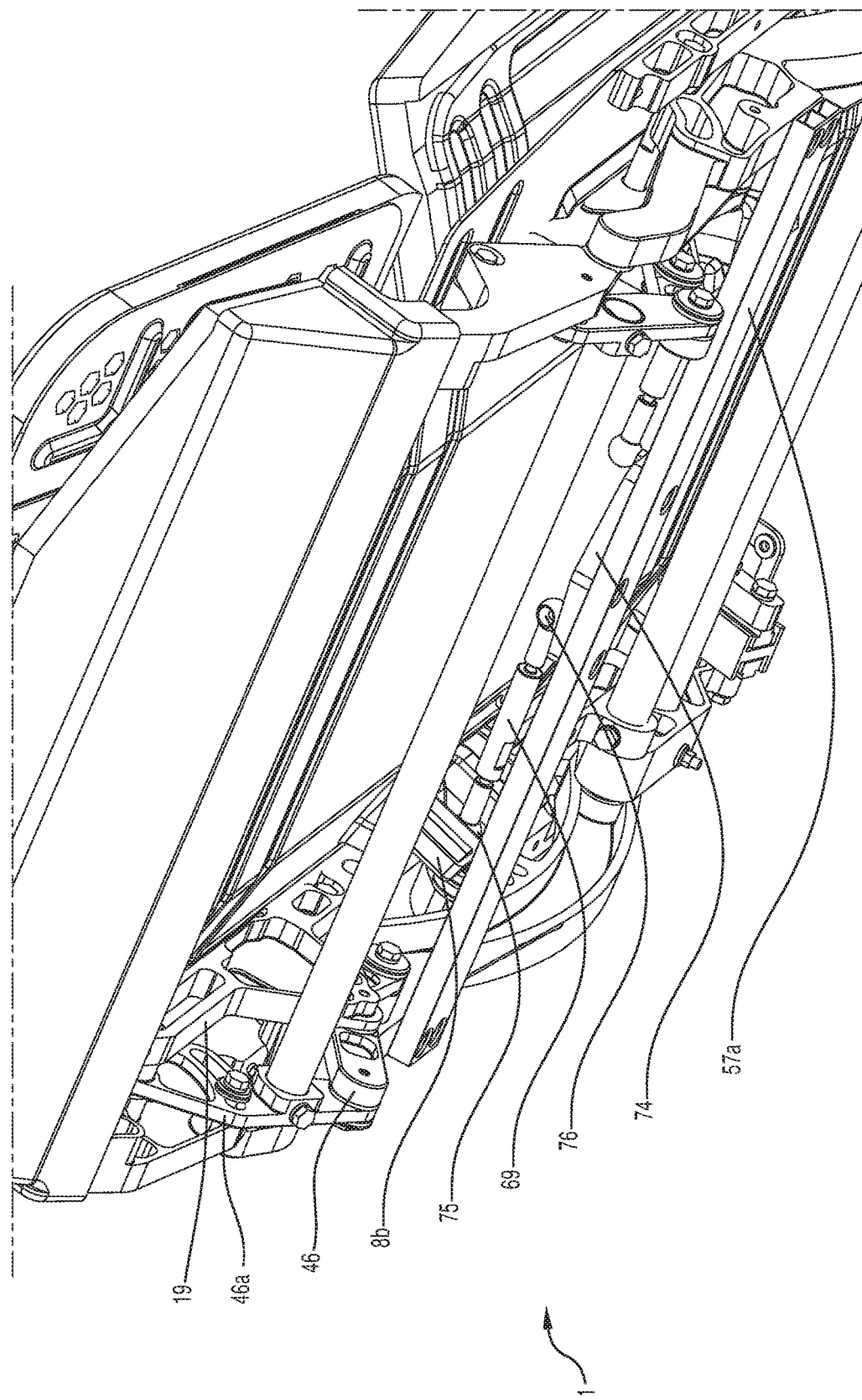
FIG. 18 is a perspective view of the side wing deployment mechanism in engagement with the linkages of the seat back frame.

The wing deployment mechanism 68 comprises a pair of linkages 69, illustrated in FIGS. 16 and 18. Each of the linkages 69 comprises a telescoping beam having a first joint 75 at an outboard end of the linkage 69 and each having a second joint 76 at an inboard end of the linkage 69. The joints 75, 76 allow for articulation of the wings 8, 9 via the wing deployment mechanism 68.

The rear portions of each wing 8*b*, 9*b* extend through the seat back 10 to allow operation of the front portion of the wings 8, 9 on the passenger facing side of the seat 1. This mechanism is illustrated in FIGS. 17A-C and 18.

The deployment mechanism 68 is connected to the seat back frame 57, such that as the seat 1 enters bed mode and the scissor mechanism 26 moves towards the fully extended configuration the deployment mechanism 68 is deployed to influence movement of the wings 8, 9 movably mounted to the seat back 10. There is no independent driving mechanism for the wings 8, 9. The movement of the seat pan 5, and thus movement of the seat pan frame 52, which is connected to the outer seat back frame 89 activates the deployment mechanism 68 (as described in reference to FIG. 16).

The inboard joints 76 of the linkages are mounted to the linkage mount bracket 74. The linkage mount bracket 74 is mounted to a cross-member 57*a* of the seat back frame 57. As the scissor mechanism 26 extends and seat 1 reclines, a primary arm 19 in engagement with the seat pan frame 52 (via the outer seat back frame 89) is moved relative to the seat back frame 57. The primary arm 19 can be arranged to move through a predetermined arcuate path by virtue of the curved track 11 in the seat back frame 57, and track follower 88 that engages the primary arm 19 with the seat back frame 57 (see FIG. 17B). As the primary arm 19 moves along the curved track 11, the linkage mount bracket 74 does not move, and the linkages 69 are reoriented, urging the wings 8, 9 to adjust to a flat, storage configuration. Through one or more secondary arms 46, 46*a*, 46*b* the movement of the primary arm 19 is translated to urge the headrest 7 to move in a complimentary fashion as the seat 1 reclines (see FIG. 17C).

FIG. 18, illustrates one embodiment of the deployment mechanism 68, wherein the outboard joint 75 of the linkages 69 are respectively engaged with the rear portion 8*b*, 9*b* of each wing 8, 9. The curved track 11, illustrated in FIG. 18, curves relative to the seat back frame 57, such that as the primary arm 19 is translated relative to the curved track 11, each of the linkages 69 urges the rear portion 8*b*, 9*b* (and also urges the attached front portion of each wing 8*a*, 9*a*) to move into a flat, storage configuration, as the seat 1 reclines.

Privacy Screen

Further described herein, is a privacy screen 80 for separating two adjacent seating locations on an aircraft, wherein the privacy screen is movably configured to provide an open mode, a partially-open mode and a closed mode.

Figure 19A:
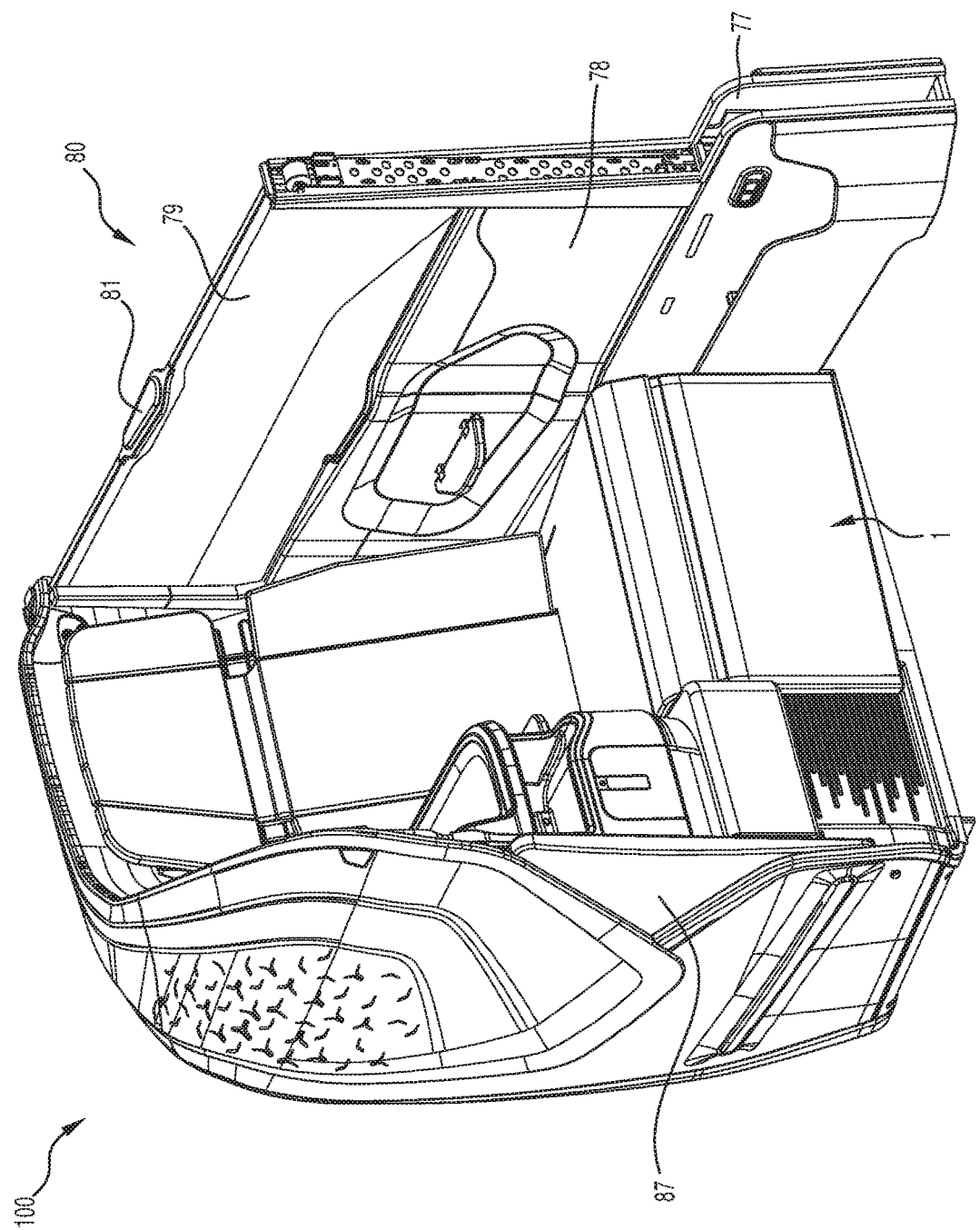
FIG. 19A is a perspective view of a seat and seat chamber from a forward, aisle position looking into the chamber.
Figure 19B:
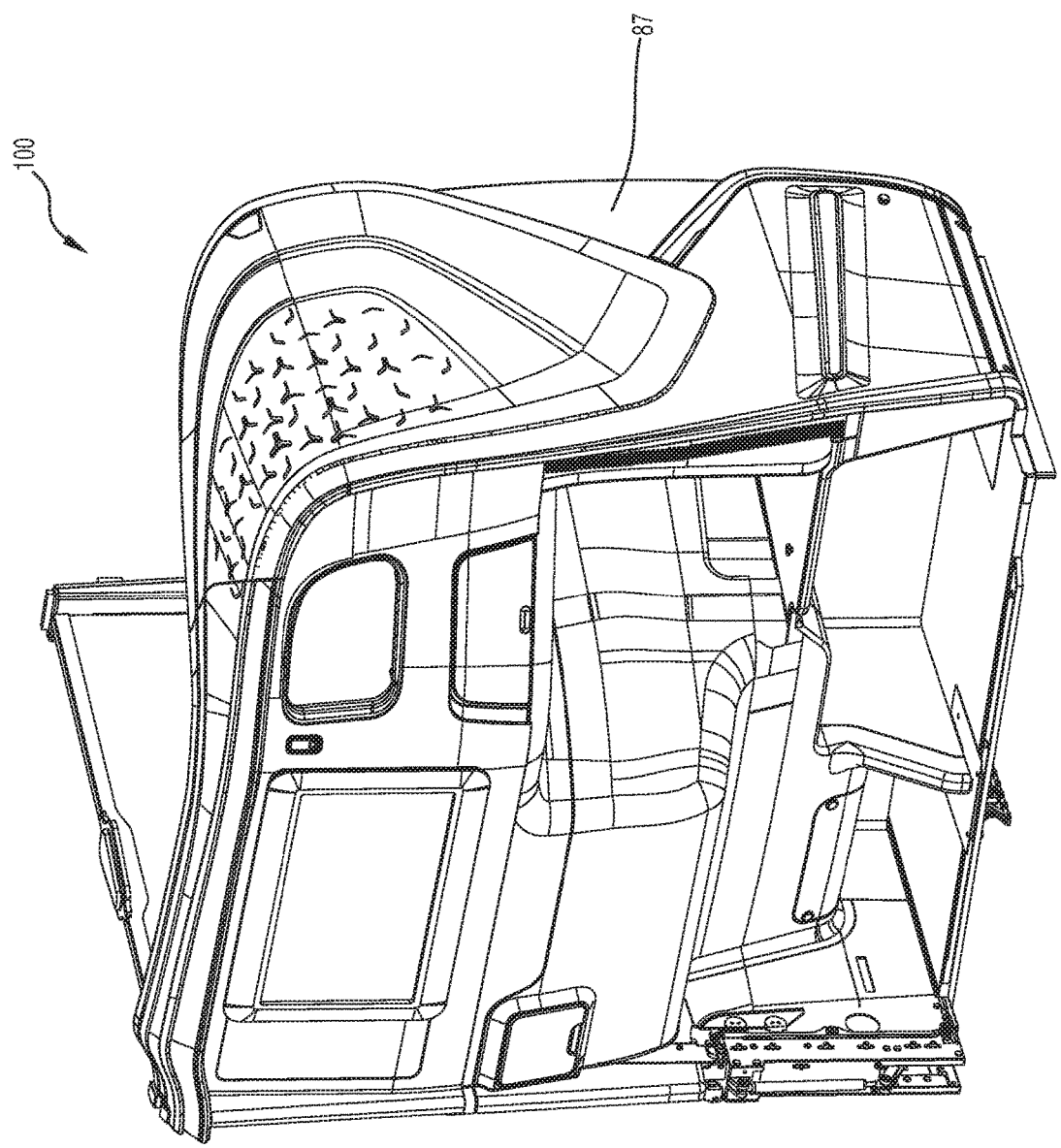
FIG. 19B is a perspective view of a seat and seat chamber from a rearward, aisle position looking onto the rear of the chamber, illustrating a footwell.

The privacy screen 80 in closed mode is illustrated in each of FIGS. 19A and 19B, firstly from a perspective angle looking into the pod 100 and secondly from a perspective view looking onto the back of the pod 100. An opposing side of the seat 1 to the privacy screen 80 provides a pod sidewall 87 which provides privacy from isle traffic.

An entrance 96 to the pod 100 is formed between each subsequent shroud 99 defining a pod 100 and a subsequent pod 100' (see FIG. 21). When the central privacy screen 80 is in the closed mode, the seated passenger is visually isolated from neighbouring passengers on the aircraft. In a situation where a passenger is travelling with a companion and they are seated in two adjacent seats, the central privacy screen 80 can be placed fully open mode, to allow the individual pods 100, 100' to form a single double occupancy pod.

The privacy screen 80 illustrated in FIG. 19A, comprises a base member 77, an intermediate member 78 and an upper member 79.

The privacy screen 80 comprises one static base member 77, and one or more moving panels, in this embodiment; the intermediate member 78 and the upper member 79. However, it is contemplated that a similar effect could be achieved with as few as two members or four or more members to make-up the screen 80.

The privacy screen 80 provides the passenger with the option of:
(1) a fully closed mode, providing maximum privacy from the adjacent passenger (on the other side of the centreline of the cabin/aircraft); or
(2) a fully open mode where the passengers can interact with one another above bed height; or
(3) an intermediate level of privacy between these two extremes of (1) and (2) (see FIG. 20B).

In the fully open mode (1), if both seats are in bed mode, the seat effectively provides a double bed experience to couples (albeit their feet cannot touch on most seats).

The base member 77 is static and mounted to the cabin floor 98. A storage compartment 85 is incorporated into at least one of the base member 77, the intermediate member 78 and the upper member 79 or the privacy screen 80. Although any of the privacy screen members can comprises a storage compartment 85, the base member 77 is more suited to providing a large storage compartment 85 for storing heavier items.

To allow phased deployment of the privacy screen 80, the upper member 79 is configured to be telescopically extended and retracted from the intermediate member 78. A ratchet or internally stepped mechanism can be provided to allow discrete opening and closing steps when telescopically moving the upper 79 and intermediate 78 members relative to one another.

Furthermore, the upper member 79 and the intermediate member 78 are configured to be telescopically extended and retracted from the base member 77. Again a ratchet or internally stepped mechanism can be provided to allow discrete opening and closing steps when telescopically moving the stacked upper 79 and intermediate 78 members, relative into and out of the base member 77.

When, in the open mode, the upper member 79 and the intermediate member 78 are fully retracted into the base member 77, such that an uppermost surface 81 of the privacy screen 80 is substantially level with a seat pan 5 of an adjacent seat 1.

A pair of guides 83, 84 are provided in which the upper 79 and intermediate 78 members slidably translate. The guides 83, 84 can be a pair of tracks for the privacy screen members to slide within. Alternatively, the guides 83, 84 can provide a ratchet system for controlling the extension and retraction of the upper member and intermediate member therealong.

At least one of a front guide 83 and a rear guide 84 can be incorporated into the shroud 99 around the seat 1 that defines the pod 100.

Movement of the upper member 79 or the intermediate member 78 is physically effected by a passenger, by pulling or pushing on the movable members. The members can be formed to provide handles or protruding forms or recesses to enable the passenger to grip and thereby adjust the individual members of the privacy screen 80.

In some embodiments, movement of the upper member 79 or the intermediate member 78 is effected by an electric motor or actuator. The movement of the privacy screen 80 can be effected by each of the passengers seated adjacent the privacy screen 80.

In some embodiments, the moving members 78, 79 are driven by gas struts, which enable the passenger to move the members easily despite their weight (not illustrated Each of the upper 79, intermediate 78 and base members 77 of the privacy screen 80 extend wholly across a pod 100 of the seat 1. As such, the privacy screen 80 in closed mode prohibits visual and physical contact between two passengers seated adjacent the privacy screen (see FIG. 20C). Alternatively, the privacy screen 80 in open mode facilitates physical and visual contact between two passengers seated adjacent the privacy screen 80 (see FIG. 20A).

Figure 20A:
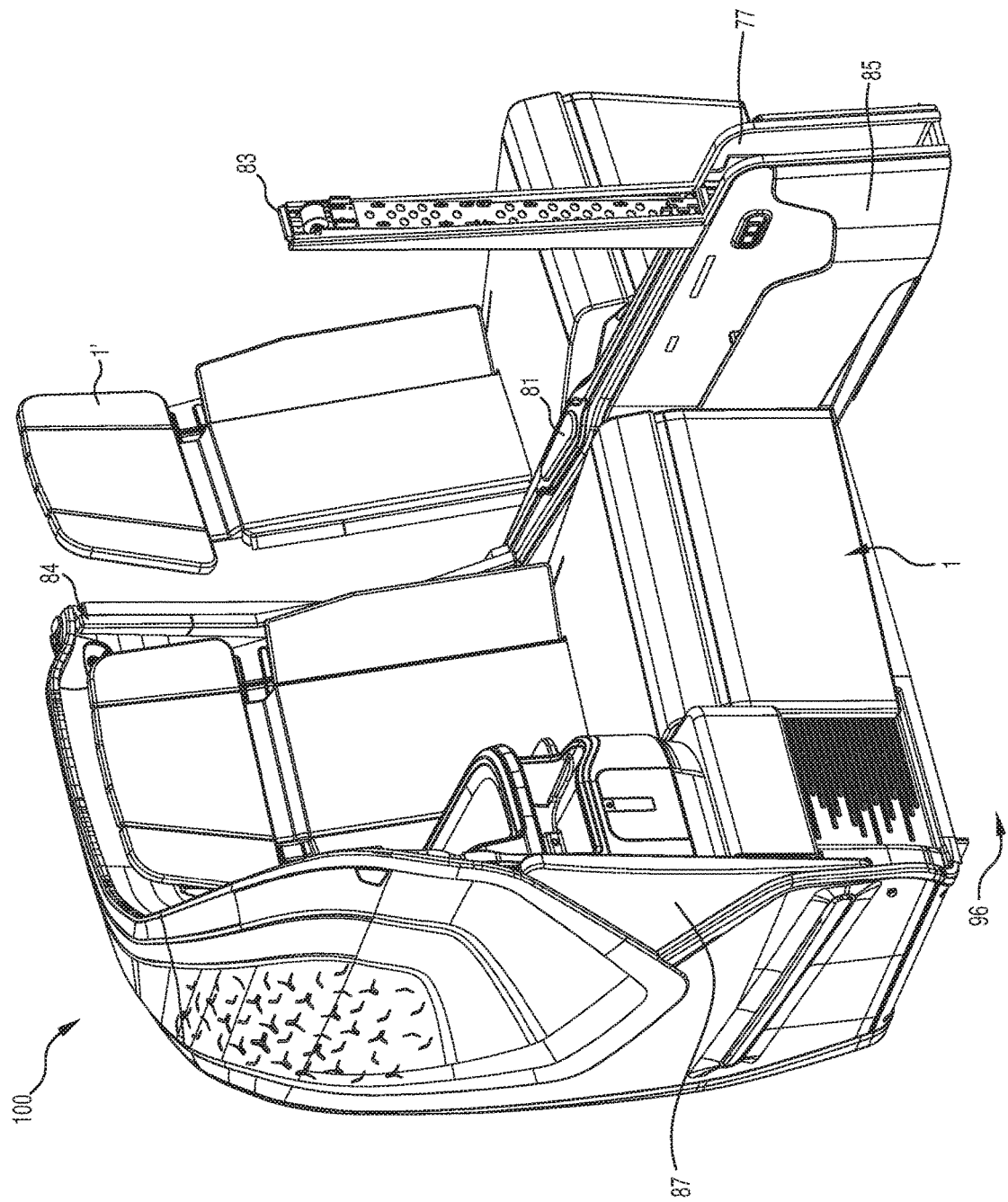
FIG. 20A is a view of a central seating pair with a central privacy screen in a "fully open" mode.
Figure 20C:
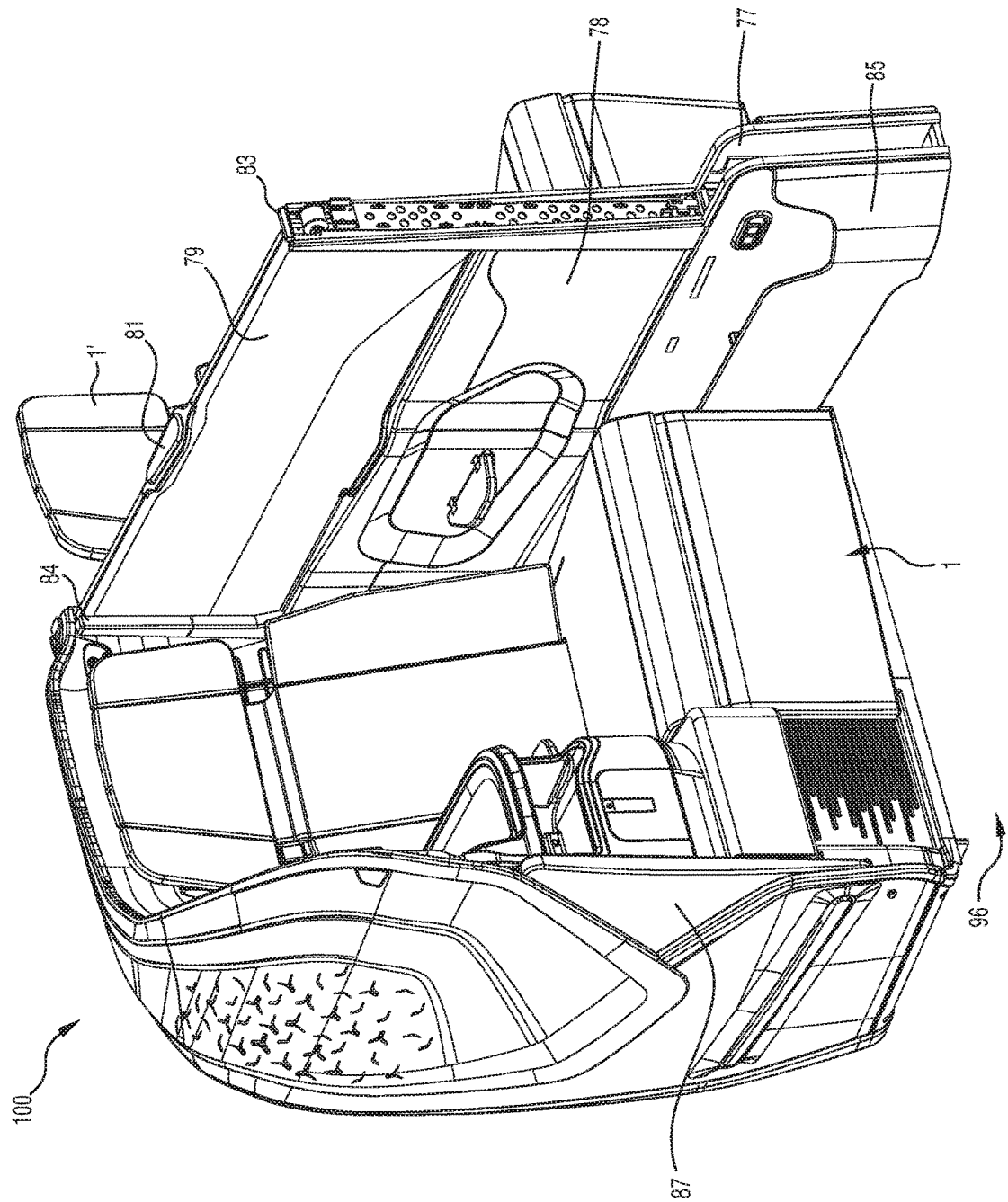
FIG. 20C is a view of the central seating pair of FIG. 20A with the central privacy screen in a "fully closed" mode.

For maximum privacy, as shown on in FIG. 20C, the intermediate member 78 is fully extended from within the base member 77, and the upper member 79 is fully extended from within the intermediate member 78. This results in a total structure height which is close to 3 times that of the minimum privacy mode or "open mode".

Achieving close to 3 times the height between the fully open mode and the fully closed mode of the privacy screen 80 is important due to the comparative differences in height between bed mode height and upright seated height. It is desirable to achieve a level of privacy for passengers sleeping to be shielded from their adjacent passenger seated in an upright position.

The partially-open mode, as shown in FIG. 20B is where the intermediate member 78 is fully extended from within the base member 77, and the upper member 79 is fully retracted within the intermediate member 78. This results in a total structure height which is close to two times that of the minimum privacy or "open" mode.

The partially-open mode is valuable as it offers the correct level of privacy for passengers who wish to converse whilst maintaining their personal space.

For minimum privacy or fully "open mode", as shown in FIG. 20A the upper member 79 is stowed almost entirely within the intermediate member 78, which is in turn almost entirely stowed within the base member 77.

The height of the privacy screen 80 in the fully "open" mode is approximately the same level as the seat 1 in the substantially flat configuration or bed mode (1C). This allows the passengers seated adjacent the privacy screen 80 to experience a double bed experience.

As illustrated in FIG. 21 the orientation of the seats 1, 1' in each pair can be adjusted depending on the available cabin space. As such, the layout of pod 100 for a seat in the forward most position can allow the seat to recline in an orientation that aligns with a centre line of the aircraft. However, a second pod 100', located behind the forward most seat 1 can only accommodate a seat 1' that is offset across the pod 100' to prevent the passengers legs from coming into contact with the rear of seat 1 or the shroud 99 surrounding the seat 1.

On a standard seat 1, for accommodating the passenger in bed mode, the passenger footwell 86 (the packaging space for a passenger's feet) is located outboard, within the pod 100, i.e. towards the aisle, resulting in a sleeping position which is angled away from the centreline of the aircraft. This is a feature of the cabin layout, caused by the fact that the most forward seat 1 in any configuration will overlap with the bed configuration of a more rearward seat 1.

For the front row seats, there are no passengers/seats in front of them, only a galley unit or similar. Thus for front row passengers only, the footwell 86 can span almost the entire width of the pod 100. This means that reclining/sleeping passengers in front row seats 1 will not need to angle their bodies away from the centreline of the aircraft.

When the substantially flat seat is combined with the fully open privacy screen, a pair of passengers can enjoy a 'double bed experience' during their flight.

Passengers have the option of increased privacy from fellow travellers (across the centreline of the aircraft); the option of a very open space, ideal for couples, families etc.; and a 'double bed' arrangement if desired.

The privacy screen can be made from a number of different, lightweight materials, for example, plastic, composite, fibrous composite, fibrous board. The privacy screen 80 is sufficiently strong not to warp or dent when in use during a flight, but will not be required to take high structural loading in use.

It will be appreciated by persons skilled in the art that numerous variations and modifications may be made to the above-described embodiments, without departing from the scope of the following claims. The present embodiments are, therefore, to be considered in all respects as illustrative and not restrictive.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A seat comprising:
   a moveable seat carriage having a seat pan and a seat back supported thereon;
   a seat base supporting the moveable seat carriage thereupon;
   a support member moveable between a retracted configuration and an extended configuration, wherein a first end of the support member is coupled to the moveable seat carriage and a second end of the support member is coupled to the seat base; and
   an actuator to move the moveable seat carriage relative to the seat base to thereby transition the seat between an upright position and a reclined position, with the movement of the seat carriage driving the support member between the retracted configuration and the extended configuration,
   wherein, the support member stiffens the seat as the seat transitions away from the upright to the reclined position and while in the reclined position,
   wherein the support member is a scissor mechanism, and
   wherein the scissor mechanism includes a primary pair of arms coupled together for pivoting movement about an axis extending perpendicular to a plane of each of the primary pair of arms between the extended configuration in which the primary pair of arms lie substantially on top of each other parallel to the first direction and the retracted configuration in which the primary pair of arms lie substantially on top of each other perpendicular to the first direction; and wherein the first ends of each of the primary pair of arms are coupled with the seat base and the second ends of each of the primary pair of arms are coupled with the seat carriage.

2. The seat according to claim 1, wherein the axis bisects each of the primary pair of arms between a first end and a second end of each arm.

3. The seat according to claim 1, wherein the scissor mechanism comprises:
   a secondary pair of arms, the secondary pair of arms pivotally connected to one another at first ends thereof to form a V-shaped arrangement when viewed in plan view;
   each second end of the secondary pair of arms being pivotally connected to one of each of the first ends of the primary pair of arms, respectively
   such that the first ends of the primary pair of arms are coupled to the seat base via the secondary pair of arms.

4. The seat according to claim 3, wherein the scissor mechanism comprises:
   a tertiary pair of arms, the tertiary pair of arms pivotally connected to one another at first ends thereof to form a V-shaped arrangement when viewed in plan view;
   each second end of the tertiary pair of arms being pivotally connected to one of each of the second ends of the primary pair of arms, respectively such that the second ends of the primary pair of arms are coupled to the seat carriage via the tertiary pair of arms.

5. The seat according to claim 1, wherein the moveable seat carriage and the seat pan further comprise complementary seat frames which support the seat pan and the seat back.

6. The seat according to claim 5, wherein the seat frame comprises a cam surface and the seat pan frame comprises a cam follower, with the cam follower movably supported on the cam surface, such that movement of the seat pan frame relative to the seat frame follows the cam surface to vary orientation of the seat pan frame.

7. The seat according to claim 1, wherein the seat back is pivotally connected to the seat pan, such that movement of the seat pan causes movement of the seat back.

8. A seat comprising:
a moveable seat carriage having a seat pan and a seat back supported thereon;
a seat base supporting the moveable seat carriage thereupon;
a support member moveable between a retracted configuration and an extended configuration, wherein a first end of the support member is coupled to the moveable seat carriage and a second end of the support member is coupled to the seat base; and
an actuator to move the moveable seat carriage relative to the seat base to thereby transition the seat between an upright position and a reclined position, with the movement of the seat carriage driving the support member between the retracted configuration and the extended configuration,
wherein, the support member stiffens the seat as the seat transitions away from the upright to the reclined position and while in the reclined position, and
further comprising a deployment mechanism connected to the seat back, such that, in use, as the movable seat carriage moves away from the seat base, the deployment mechanism is caused to move a pair of wings mounted to the seat back.

9. The seat according to claim 8, wherein the pair of wings is coupled on opposing sides of the seat back and the wings are configured to move between an operative position where the wings extend from the seat back in an angled configuration and a storage position where the wings extend in alignment with the seat back to provide a substantially flat seat back.

10. The seat according to claim 9, wherein the deployment mechanism comprises a pair of telescoping members an outboard end of each being respectively coupled to one of the pair of wings.

11. The seat according to claim 10, wherein the outboard end of each of the pair of telescoping members is coupled with each of the wings respectively, such that movement of the movable seat carriage towards the seat base causes the telescoping members to urge the wings of the seat back into the operative position.

12. The seat according to claim 11, wherein each wing comprises a front portion that is located on a passenger facing side of the seat and a rear portion that is located on a rear facing side of the seat.

13. The seat according to claim 12, wherein the front portion of each wing is rigidly connected to the rear portion of each wing and the rear portion extends through the seat, such that movement of the rear portion of the wing moves the front portion of the wing.

14. The seat according to claim 13, wherein an outboard end of each telescoping member engages with the respective rear portions of the wing to drive the wings between the storage position and the operative position.

15. The seat according to claim 14, comprises an armature extending along the seat-back, the armature configured to respond to movement of the movable seat carriage and thereby effect movement of the outboard ends of each telescoping member along the arched track to move the wings between the operative position and the storage position.

16. The seat according to claim 15, wherein an inboard end of each of the pair of telescoping members is movably mounted to a seat back frame, such that when the movable seat carriage moves the seat to a bed mode the telescoping members urge the wings into the storage position.

17. The seat according to claim 1, wherein the seat is an aircraft seat.

18. A support member for a seat the support member comprising:
a scissor mechanism including a primary pair of arms coupled together for pivoting movement about an axis extending perpendicular to a plane of each of the primary pair of arms between an extended configuration in which the primary pair of arms lie substantially on top of each other parallel to the first direction and a retracted configuration in which the primary pair of arms lie substantially on top of each other perpendicular to the first direction; and
wherein in use the first ends of each of the primary pair of arms are coupled with a seat base and the second ends of each of the primary pair of arms are coupled with a moveable seat carriage, such that, movement of the moveable seat carriage away from the seat base causes movement of the scissor mechanism towards the extended configuration.

19. The support member according to claim 18, wherein the axis bisects each of the primary pair of arms between a first end and a second end of each arm.

20. The support member according to claim 18, wherein the scissor mechanism comprises:
a secondary pair of arms, the secondary pair of arms pivotally connected to one another at first ends thereof to form a V-shaped arrangement when viewed in plan view;
each second end of the secondary pair of arms being pivotally connected to one of each of the first ends of the primary pair of arms, respectively
such that the first ends of the primary pair of arms are coupled with the seat base via the secondary pair of arms.

21. The support member according to claim 20, wherein the scissor mechanism comprises:
a tertiary pair of arms, the tertiary pair of arms pivotally connected to one another at first ends thereof to form a V-shaped arrangement when viewed in plan view;
each second end of the tertiary pair of arms being pivotally connected to one of each of the second ends of the primary pair of arms, respectively
such that the second ends of the primary pair of arms are coupled with the seat carriage via the tertiary pair of arms.

22. The seat according to claim 2, wherein the seat is an aircraft seat.

23. The seat according to claim 3, wherein the seat is an aircraft seat.

24. The seat according to claim 5, wherein the seat is an aircraft seat.

25. The seat according to claim 7, wherein the seat is an aircraft seat.

26. The seat according to claim 8, wherein the seat is an aircraft seat.

27. The support member according to claim 18, wherein the seat is an aircraft seat.

28. The support member according to claim 20, wherein the seat is an aircraft seat.

* * * * *